United States Patent
Lei et al.

(10) Patent No.: US 11,244,402 B2
(45) Date of Patent: Feb. 8, 2022

(54) PREDICTION ALGORITHM BASED ATTRIBUTE DATA PROCESSING

(71) Applicant: Advanced New Technologies Co., Ltd., Grand Cayman (KY)

(72) Inventors: Yuxiang Lei, Hangzhou (CN); Guanru Li, Hangzhou (CN); Wei Ding, Hangzhou (CN); Jing Huang, Hangzhou (CN); Chunping Tan, Hangzhou (CN); Shiyi Chen, Hangzhou (CN); Mingqian Shi, Hangzhou (CN); Peilin Zhao, Hangzhou (CN); Longfei Li, Hangzhou (CN); Zhiqiang Zhang, Beijing (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 108 days.

(21) Appl. No.: 16/022,194

(22) Filed: Jun. 28, 2018

(65) Prior Publication Data
US 2019/0005586 A1    Jan. 3, 2019

(30) Foreign Application Priority Data

Jun. 30, 2017    (CN) .......................... 201710525064.7

(51) Int. Cl.
*G06Q 40/08*    (2012.01)
*G06K 9/62*    (2006.01)
*G06N 3/02*    (2006.01)
*H04L 29/08*    (2006.01)

(52) U.S. Cl.
CPC .......... *G06Q 40/08* (2013.01); *G06K 9/6256* (2013.01); *G06N 3/02* (2013.01); *H04L 67/306* (2013.01)

(58) Field of Classification Search
CPC ........ G06Q 40/08; G06K 9/6256; G06N 3/02; H04L 67/306
See application file for complete search history.

(56) References Cited

U.S. PATENT DOCUMENTS

| | | |
|---|---|---|
| 8,051,033 B2 | 11/2011 | Kenedy et al. |
| 9,953,372 B1 * | 4/2018 | Dziabiak ................ G06Q 30/02 |
| 2003/0030637 A1 | 2/2003 | Grinstein et al. |

(Continued)

FOREIGN PATENT DOCUMENTS

| | | |
|---|---|---|
| CN | 101937421 | 1/2011 |
| CN | 105139648 | 12/2015 |

(Continued)

OTHER PUBLICATIONS

Tevet, "And the Winner Is . . . ? How to Pick a Better Model", Mar. 2013, Casualty Actuarial Society, RPM. (Year: 2013).*

(Continued)

*Primary Examiner* — Abdulmajeed Aziz
(74) *Attorney, Agent, or Firm* — Fish & Richardson P.C.

(57) ABSTRACT

A plurality of variable data of personal attribute information associated with at least one vehicle insurance user is received at a prediction server. Based on a service scenario requirement, a pre-constructed prediction algorithm is selected. The plurality of variable data is processed by one or more processors using the pre-constructed prediction algorithm. At least one prediction result is generated as the prediction server.

15 Claims, 11 Drawing Sheets

(56) References Cited

U.S. PATENT DOCUMENTS

| | | | | |
|---|---|---|---|---|
| 2003/0101080 | A1* | 5/2003 | Zizzamia | G06F 17/18 |
| | | | | 705/4 |
| 2006/0253307 | A1 | 11/2006 | Warren et al. | |
| 2007/0226014 | A1 | 9/2007 | Alemayehu et al. | |
| 2010/0332475 | A1 | 12/2010 | Birdwell et al. | |
| 2014/0149150 | A1 | 5/2014 | Zizzamia et al. | |
| 2015/0025917 | A1* | 1/2015 | Stempora | G06K 9/0061 |
| | | | | 705/4 |
| 2015/0066542 | A1* | 3/2015 | Dubens | G06Q 40/08 |
| | | | | 705/4 |
| 2015/0161738 | A1* | 6/2015 | Stempora | G06Q 40/08 |
| | | | | 705/4 |
| 2017/0300824 | A1* | 10/2017 | Peng | G06F 11/3409 |
| 2019/0005198 | A1* | 1/2019 | Richards | G06Q 10/10 |
| 2020/0335124 | A1* | 10/2020 | Herzig | G06N 3/08 |

FOREIGN PATENT DOCUMENTS

| | | |
|---|---|---|
| CN | 105488046 | 4/2016 |
| CN | 105528652 | 4/2016 |
| CN | 106022787 | 10/2016 |
| CN | 106022928 | 10/2016 |
| CN | 106114515 | 11/2016 |
| CN | 106156877 | 11/2016 |
| CN | 106293626 | 12/2016 |
| CN | 106411998 | 2/2017 |
| CN | 106447139 | 2/2017 |
| CN | 106600021 | 4/2017 |
| TW | 201629898 | 8/2016 |

OTHER PUBLICATIONS

Taylor, "Stochastic Loss Reserving Using Generalized Linear Models", 2016, Casualty Actuarial Society. (Year: 2016).*
Yang, "Insurance Premium Prediction via Gradient Tree-Boosted Tweedie Compound Poisson Models", Apr. 2016 (Year: 2016).*
International Search Report and Written Opinion in Application No. PCT/US2018/040407, dated Oct. 4, 2018, 12 pages.
Crosby et al., "BlockChain Technology: Beyond Bitcoin," Sutardja Center for Entrepreneurship & Technology Technical Report, Oct. 16, 2015, 35 pages.
Nakamoto, "Bitcoin: A Peer-to-Peer Electronic Cash System," www.bitcoin.org, 2005, 9 pages.
PCT International Preliminary Report of Patentability in international Application No. PCT/US2018/040407 dated Jan. 9, 2020, 7 pages.

* cited by examiner

PREDICTION ALGORITHM BASED ATTRIBUTE DATA PROCESSING

This application claims priority to Chinese Patent Application No. 201710525064.7, filed on Jun. 30, 2017, which is hereby incorporated by reference in its entirety.

TECHNICAL FIELD

The present disclosure relates to the field of computer data processing technologies.

BACKGROUND

As vehicle possession increases year by year, the insurance company's vehicle insurance business volume has also increased. One important research direction for insurance companies is accurately assessing vehicle insurance risks of insured vehicles to formulate reasonable vehicle insurance services such as underwriting, pricing, and service projects.

Currently, insurance companies mainly rely on the vehicle's own attribute information for pricing and modeling, to develop corresponding vehicle insurance services for different insured vehicles, and to provide the service to users. The attribute information includes, for example, the appearance, the age of the vehicle, and the mileage of the vehicle. In the practice of vehicle insurance business, other factors can also affect whether the vehicle is involved in an accident and a claim amount such as, the natural environment of the location of the vehicle, and the condition of the road the vehicle often travels. Therefore, the industry needs a more comprehensive and accurate solution to predict the vehicle insurance risk.

SUMMARY

One or more implementations of the present disclosure aim to provide a vehicle insurance risk prediction method and apparatus, and a server. The vehicle insurance risk can be predicted by using personal attribute information of a vehicle insurance user, so as to provide a more comprehensive, accurate, and reliable basis for predicting the vehicle risk, and improve accuracy and reliability of vehicle insurance risk assessment.

The vehicle insurance risk prediction method and apparatus, and the server provided in one or more implementations of the present disclosure are implemented in the following manner:

The vehicle insurance risk prediction method includes: obtaining personal attribute information of a vehicle insurance user, where the personal attribute information includes at least one kind of natural attribute information, social attribute information, or behavioral data of a natural person; and processing the personal attribute information by using a pre-constructed vehicle insurance risk prediction algorithm, to obtain a predicted vehicle insurance risk result of the vehicle insurance user.

The vehicle insurance risk prediction apparatus includes: a personal attribute acquisition module, configured to obtain personal attribute information of a vehicle insurance user, where the personal attribute information includes at least one kind of natural attribute information, social attribute information, or behavioral data of a natural person; and a risk prediction module, configured to process the personal attribute information by using a pre-constructed vehicle insurance risk prediction algorithm, to obtain a predicted vehicle insurance risk result of the vehicle insurance user.

The vehicle insurance risk prediction apparatus includes a processor and a memory configured to store an executable instruction of the processor, and the processor executes the instruction to implement: obtaining personal attribute information of a vehicle insurance user, where the personal attribute information includes at least one kind of natural attribute information, social attribute information, or behavioral data of a natural person; and processing the personal attribute information by using a pre-constructed vehicle insurance risk prediction algorithm, to obtain a predicted vehicle insurance risk result of the vehicle insurance user.

The server includes at least one processor and a memory configured to store an executable instruction of the processor, and the processor executes the instruction to implement the data processing steps in any method in the implementations of the present disclosure.

In the vehicle insurance risk prediction method and apparatus, and a server provided in the implementations of the present disclosure, pre-collected and processed personal attribute information can be used to establish a vehicle insurance risk prediction algorithm, which can be used to process personal attribute information of the to-be-predicted vehicle insurance user, to predict the impact of vehicle insurance users on vehicle risks from the perspective of a natural person. In actual vehicle use, personal factors generally greatly affect the vehicle insurance services, such as whether the vehicle is involved in an accident and a specific amount of the insurance payment. In the implementation solutions provided in the implementations of the present disclosure, vehicle risk prediction is performed by using the personal attribute information, to provide more accurate and reliable basis for vehicle insurance risk assessment, so that accuracy and reliability of vehicle insurance risk assessment can be effectively improved.

BRIEF DESCRIPTION OF DRAWINGS

To more clearly explain the technical solutions in the implementations of the present disclosure or in the existing technology, the accompanying drawings required for describing the implementations or the existing technology will be briefly described below. Apparently, the accompanying drawings in the following description are only some implementations of the present disclosure, and persons of ordinary skill in the art may still derive other drawings from these accompanying drawings without creative efforts.

DESCRIPTION OF EMBODIMENTS

Figure 1:
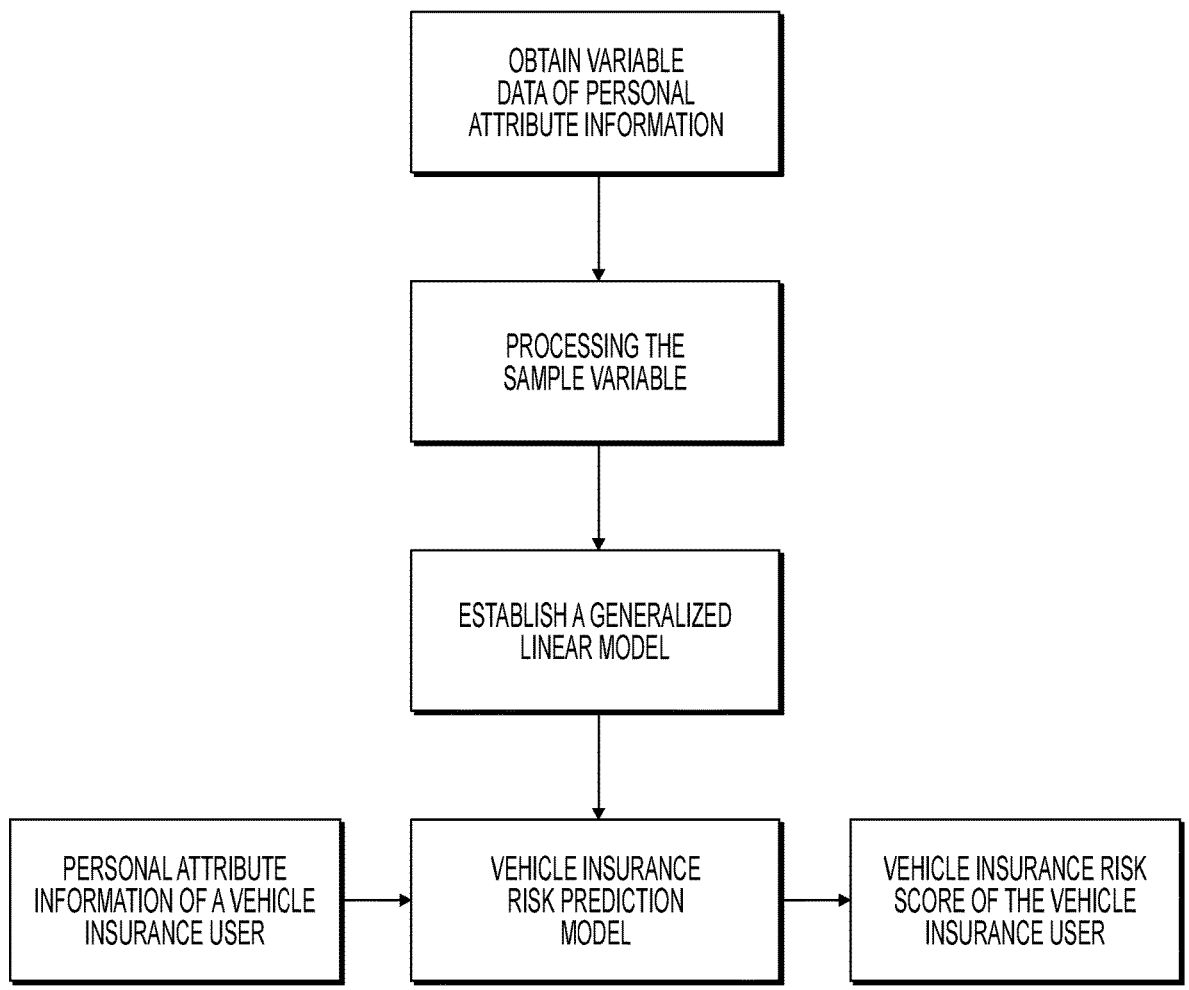
FIG. 1 is a schematic diagram illustrating an implementation scenario in which vehicle insurance risk prediction is implemented according to an implementation of the present disclosure.

To make a person skilled in the art understand the technical solutions in the present disclosure better, the technical solutions in the implementations of the present specification will be clearly and completely described with service scenario requirement reference to the accompanying drawings in the implementations of the present disclosure. Apparently, the described implementations are merely some rather than all of the implementations of the present disclosure. All other implementations obtained by a person of ordinary skill in the art based on the implementations of the present disclosure without making creative efforts shall fall within the protection scope of the present disclosure.

Although the present disclosure provides the method operation steps or apparatus structures as shown in the following implementations or figures, the method or the apparatus may include more operation steps or module units, or fewer operation steps or module units after combination based on conventional or non-creative efforts. In the steps or structures that logically do not have a necessary causal relationship, the order of execution of the steps or the module structure of the apparatus is not limited to the execution order or the module structure shown in one or more implementations or the drawings of the present disclosure. When the method or the module structure are applied to an actual device, server, or terminal product, the method or the module structure can be executed sequentially or in parallel according to the method or the module structure shown in the implementations or the accompanying drawings (for example, a parallel processor or a multi-thread processing environment, even including a distributed processing or server cluster implementation environment).

One or more implementations in the present disclosure can be implemented in a plurality of vehicle risk prediction service systems. The service systems can include a vehicle insurance risk assessment service system of an insurance company, and can also include a third party service system that provides a vehicle insurance risk prediction service, such as a service provider that provides an insurance company with a vehicle insurance risk assessment score of a vehicle insurance user. When one or more of the implementations provided in this specification are implemented in a service system, personal attribute information of a vehicle insurance user can be collected in advance, and the collected personal attribute information can be pre-processed. Then a vehicle insurance risk prediction algorithm applicable in a service scenario is selected for modeling and training, etc. The modeled or trained vehicle insurance risk prediction algorithm can be used to perform vehicle insurance risk prediction for a to-be-predicted vehicle insurance user. The vehicle insurance risk prediction algorithm can select, based on a service scenario requirement, a corresponding linear prediction model, a network prediction model, a calculation formula, a self-defined fitting algorithm, etc. The selected vehicle insurance risk prediction algorithm can be directly used to perform vehicle insurance risk prediction, or can be constructed after training of sample data of the personal attribute information.

The vehicle insurance risk prediction algorithm can output a predicted vehicle insurance risk result of a vehicle insurance user. Specifically, the vehicle insurance risk prediction can include a score representing the risk of the vehicle insurance user, the type of the risk, the probability of claim, the range of compensation payout, the group of risk population, and other types of vehicle insurance risk prediction results. FIG. 1 is a schematic diagram illustrating an implementation scenario in which vehicle insurance risk prediction is implemented according to an implementation of the present disclosure. As shown in FIG. 1, variables related to the personal attribute information can be obtained based on insurance policy data provided by an insurance company. These variables are used as sample variables for model training. Generally, the insurance company can record some information data of the vehicle insurance users on the side of the insurance company such as insurance policy data filled by the vehicle insurance user. Such data can specifically include a name of the owner, an ID type, an ID number, a phone number, etc. After these sample variables are sorted, they can be modeled using a generalized linear model to construct a vehicle insurance risk prediction model. Then, the model can be used for prediction, and output a score indicating a vehicle insurance risk of the vehicle insurance user.

Figure 2:
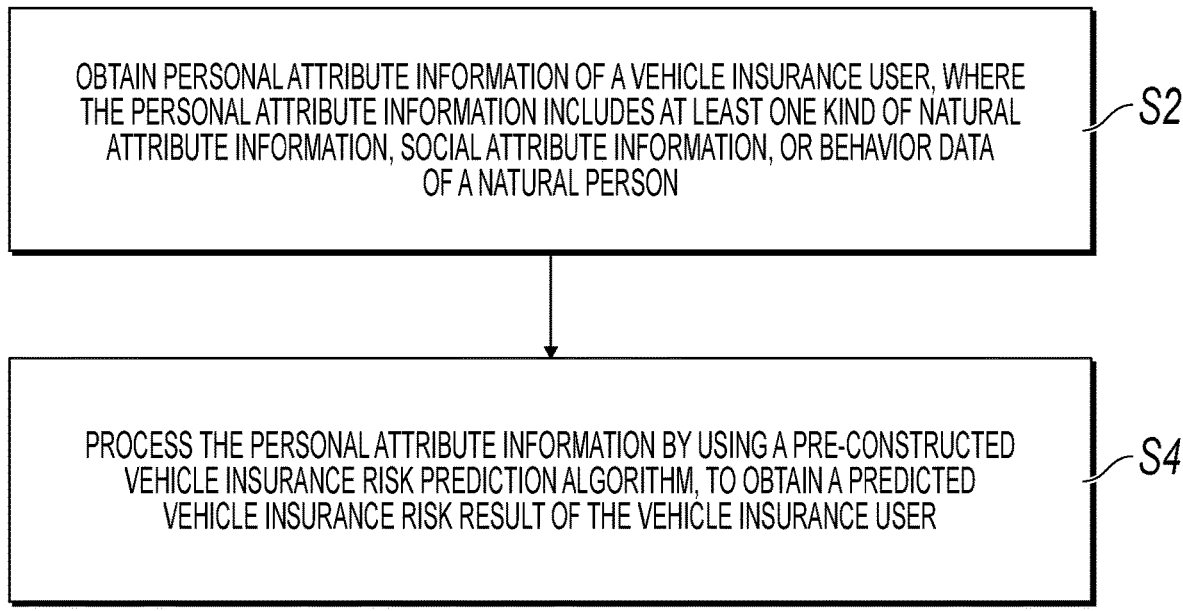
FIG. 2 is a schematic diagram illustrating a processing process of a method according to an implementation of the present disclosure.

A specific implementation of a vehicle insurance risk prediction method provided in the present disclosure is shown in FIG. 2, and the method can include:

S2. Obtain personal attribute information of a vehicle insurance user, where the personal attribute information includes at least one kind of natural attribute information, social attribute information, or behavioral data of a natural person.

S4. Process the personal attribute information by using a pre-constructed vehicle insurance risk prediction algorithm, to obtain a predicted vehicle insurance risk result of the vehicle insurance user.

The personal attribute information can include information associated with personal attributes or data associated with personal behaviors. The personal attribute here is generally a natural person, for example, an owner of a vehicle. The personal attribute information can specifically include various types of data information such as physical characteristic information, age, gender, job information, personality information, consumer credit, driving behavior, etc. In the implementation of the present disclosure, based on the factual basis that the vehicle insurance user is a natural person, personal factors are considered in vehicle insurance risk prediction, and corresponding vehicle insurance risk prediction results of vehicle insurance users can be obtained based on personal attribute information of the different vehicle insurance users.

The personal attribute information of the vehicle insurance user in the implementation of the present disclosure can specifically include natural attribute information of a natural person, such as age, gender, physical condition, and other attribute information associated with the biological characteristics of the person. The social attribute information of the vehicle insurance user can include features that the natural person has as a social existence, such as labor, social interaction, and various social relations formed by the vehicle insurance user. Specific information data can include, for example, job title, occupation, consumption status, and credit status. The behavioral data can include statistical information generated by a certain behavior of a vehicle insurance user, such as driving habits. Certainly, based on the classification of the personal attribute information in the previous implementation, classification methods of other dimensions can also be adopted in other implementations. For example, the behavior data can be classified as the social attribute information; or some information data can belong to the natural attribute information or belong to the social attribute information; or directly specify the categories included in the attribute information of the person, such as consumption habits, identity characteristics, credit history personal attribute, and the like.

The vehicle insurance user described in the implementation of the present disclosure is usually an actual owner that is registered to the insured vehicle, such as the owner of the vehicle, in the vehicle insurance service. More broadly, the vehicle insurance user described in the implementation of the present disclosure can include, for example, the above-mentioned owner of the vehicle in the vehicle insurance service, or include one or more policyholders in the vehicle insurance service, or can also include one or more of insurants/beneficiaries. For example, the vehicle insurance user can include the owner U1 of the vehicle and his/her immediate family member U11. In another implementation scenario, when the owner of the vehicle is a legal person, the vehicle insurance user can be a legal representative (natural person), and in other cases, can even include a common passenger of the vehicle. The vehicle insurance user described in the implementation of the present disclosure may not be limited to the vehicle owner participating in the vehicle insurance service, so that the stakeholders involved in the vehicle insurance risk can be more comprehensively considered, the obtained risk prediction data can be more comprehensive, and the predicted result can be more accurate and reliable.

In the implementation of the present disclosure, a preset type of personal attribute sample data used for obtaining a user's vehicle insurance risk prediction can be collected in advance. This sample data can be used to construct the vehicle insurance risk prediction algorithm or training model. Specifically, in one or more implementations of the present disclosure, the preset type of personal attribute samples can include at least one type of variable data in the following:

a driving habit, a professional characteristic, an identity characteristic, credit history, a consumption habit, or stability.

In a specific example, the following types of personal attribute information can be set to be collected:

a consumption habit;
life stability and income stability;
a professional characteristic;
an identity characteristic;
credit history; or
a driving habit or preference.

Certainly, in the implementation of a specific service scenario, one or more of these types of personal attribute information can be collected based on a vehicle insurance risk assessment requirement, or other types of personal attribute information can also be included. The personal attribute information can be obtained through the vehicle insurance service policy data, or obtained by a terminal application when authorized, or obtained by receiving data information provided by a third party. The above-mentioned life stability can be obtained based on home location based data of the vehicle insurance user in the city that the user lives, an occupational status, etc. The personality stability can be obtained based on data of the vehicle insurance user's medical history, credit history, social information, etc. The driving habit and preference can include a driving habit detected by a mobile phone sensor or a vehicle-mounted sensor. For example, it can be determined that the user is driving if the moving speed is 20 kilometers per hour or more. Certainly, data information of the driving habit can also be obtained from another existing navigation application through an interface. The personal attribute information can be obtained more comprehensively from a plurality of dimensions, making the vehicle insurance risk prediction result more reliable.

Each type of personal attribute characteristic information described above can include one or more corresponding variables, and the variables can have corresponding values. For example, the credit history of the personal attribute information can include the credit card credit data and bank credit of the vehicle insurance user, and corresponding variables and values can be set to the data format of "hon_card: 100 points" and "hon_bank: 95 points".

After the variable data of the personal attribute information is obtained, the variable data can further be sorted and processed, and the variable data may be further mined and supplemented based on a specified processing rule. In an implementation of the present disclosure, the processing can include at least one of the following:

setting a weight of the variable data;
supplementing an incomplete value in the variable data;
determining a data use selection manner of repeated variable data;
processing interaction effect between the variable data; and
generating new variable data based on the variable data.

Correspondingly, processing the personal attribute information by using the pre-constructed vehicle insurance risk prediction algorithm includes: processing the processed variable data by using the pre-constructed vehicle insurance risk prediction algorithm.

In different service scenarios, different pieces of variable data can have different effects on the vehicle insurance risk. For example, for certain service requirements of a vehicle insurance company A, if the collected variable data of the driving habit type can more directly reflect the vehicle driving risk of the vehicle insurance user and has a greater impact on the vehicle insurance service, a relatively large weight of the variable data of the driving habit type can be set. In some service scenarios, the variable data can further be sorted based on the specified variable weights. For example, variable data with a larger weight is correspondingly located at the front of the queue. When the data is used, the variable data with greater weight can be used preferentially, or important variable data is shown/reflected.

In some application scenarios, some variable data may have incomplete values. For example, if a value of a collected variable of a vehicle insurance user is null or abnormal, the variable data can be supplemented to be a default value based on requirements.

In other scenarios, variable data of a repeated type may be collected, such as variable data of a credit type obtained from different data sources, and which variable data to use preferentially can be set.

The process can further include the excavation process of interaction effects between multiple variables. The interaction effect is generally referred to as an additive effect of multiple variables. For example, age and gender can form a cross variable. In the case of having two univariates, one of the results obtained can include that the risk of a male is greater or less than that of a female in all age groups. However, in the actual vehicle insurance service, in some service scenarios, it can be determined that a vehicle insurance risk of a male is not greater than the risk of a female in all age groups. In some age groups, a vehicle insurance risk of a female is greater than that of a male. In these situations, a cross variable can be obtained by integrating variables of age and gender to indicate an age group of a certain gender, so as to predict, for example, a vehicle insurance risk for males in the 25-30 age group.

Other processing methods can further include merging or a combination of a plurality of variables, or deriving a new number of variable data through merging, combination, transformation, etc. For example, variable data of job credit can be derived based on the position of a vehicle insurance user in a company.

In one or more implementations of the present disclosure, after variable processing and excavation are completed, a vehicle insurance risk prediction algorithm applicable to a service scenario can be selected for modeling, training, etc. A modeled or trained vehicle insurance risk prediction algorithm can be used to perform vehicle insurance risk prediction for a to-be-predicted vehicle insurance user. As described above, a corresponding linear prediction model, a network prediction model, a calculation formula, or a self-defined fitting algorithm, etc. can be selected for the vehicle insurance risk prediction algorithm based on a service scenario requirement. A predictive model can be trained by sampling data of personal attribute information, and then using the trained predictive model to construct a vehicle insurance risk prediction model. In one or more implementations of the present disclosure, a generalized linear model (generalized linear model, GLM) can be used for modeling, and a modeling result can reflect the influence of personal factors on the risk of vehicle insurance. Specifically, in the vehicle insurance risk prediction method provided in one or more implementations of the present disclosure, the vehicle insurance risk prediction algorithm can include a prediction model constructed in the following manner:

S20: Collect a preset type of personal attribute sample;
S22: Determine a generalized linear model to be used and a modeling target of the generalized linear model; and
S24: Use data that includes the personal attribute sample as input of the generalized linear model, model the modeling target, and determine a vehicle insurance risk prediction model, where the vehicle insurance risk prediction model includes at least one output result that indicates a vehicle insurance risk of the vehicle insurance user.

Figure 3:
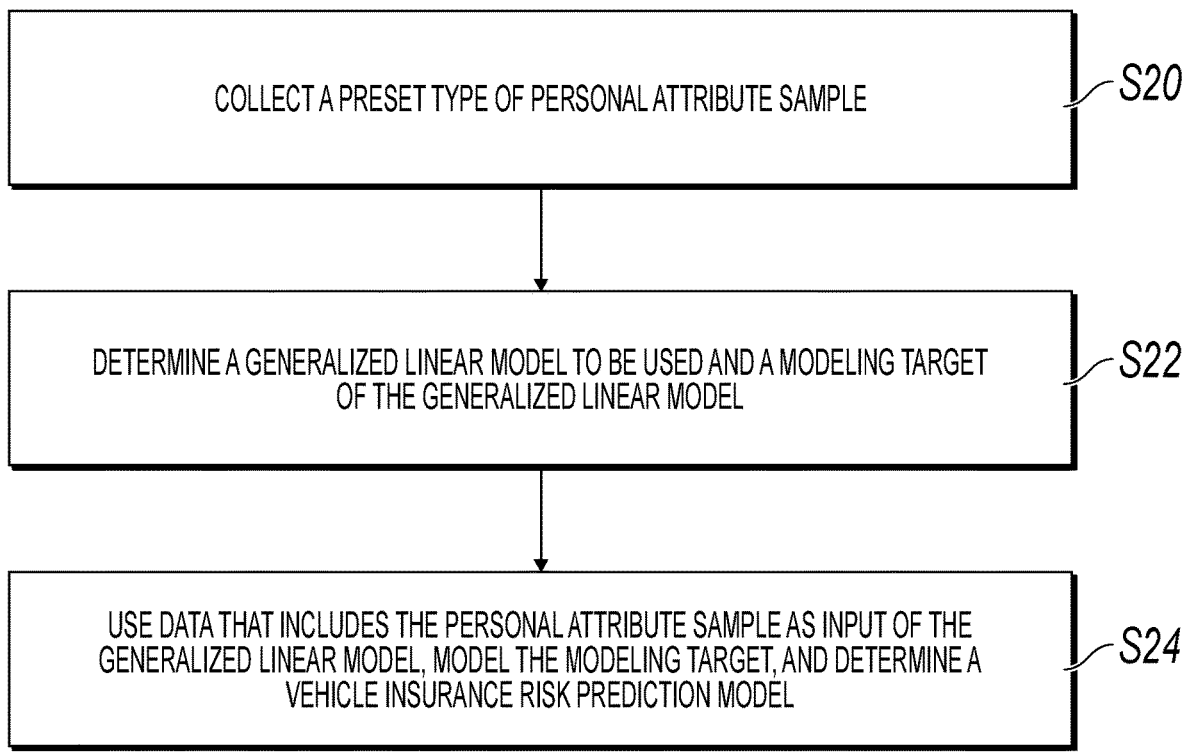
FIG. 3 is a schematic flowchart illustrating an implementation method for constructing a prediction model according to the method of the present disclosure.

FIG. 3 is a schematic flowchart illustrating an implementation method for constructing a prediction model according to the method provided by the present disclosure. The generalized linear model is designed to overcome shortcomings of a linear regression model, and is a generalization of the linear regression model. In the generalized linear model, independent variables can be discrete or continuous. Discrete independent variables can include, for example, 0-1 variables, and can also include variables of various values. In the present implementation, the generalized linear model is selected as the vehicle insurance risk prediction algorithm. The random error term of the generalized linear model does not necessarily comply with the normal distribution, and can comply with an exponential distribution family such as binomial distribution, Poisson distribution, negative distribution, normal distribution, Gamma distribution, inverse Gaussian distribution, etc. The generalized linear model can be applicable personal attribute information data that are of non-normal distribution in vehicle insurance risk prediction, and can effectively predict a vehicle insurance risk of the vehicle insurance user. A link function $g\ (\cdot)$ is introduced to the generalized linear model. Dependent variables and independent variables can exert effects through the link function, that is, $Y=g\ (X\beta)$, the link function is monotonic and derivable. Commonly used link functions include an identity function ($Y=X\beta$), a logarithmic function ($Y=\ln(X\beta)$), a power function ($Y=(X\beta)k$), a square root function ($Y=X\beta$), logit ($\ln(Y1-Y)=X\beta$), etc. Different link functions can be selected to build the model for prediction based on the data of different service scenarios and personal attribute information. In one or more implementations of the present disclosure, a generalized linear model such as a linear regression model, a maximum-entropy model, a Logistic regression model, etc. can be selected to perform vehicle insurance risk prediction.

In a specific example of using a generalized linear model to model a target in the present disclosure, modeling can be performed by using a loss ratio as a target. Here, it can be assumed that the payout ratio follows the Tweedie distribution. Tweedie distribution usually can be used, for example, in predicting a pure risk premium or a loss ratio. The Tweedie distribution can be understood as a combination of Poisson distribution and Gamma distribution. In most cases, vehicle insurance policies do not make insurance claims. Therefore, in the present implementation, the Tweedie distribution can be selected based on the situation. One of the characteristics of the Tweedie distribution is that most of the time under this distribution, the value is 0, which is in line with the current vehicle insurance data feature in the present implementation, and can be used in vehicle insurance risk prediction, to effectively implement vehicle insurance risk prediction based on the personal attribute information.

In one or more other implementations of the present disclosure, a gradient boosting decision tree (Gradient Boosting Decision Tree, GBDT) can be used to model a target for constructing a vehicle insurance risk prediction model. Based on the gradient boosting decision tree, each time, a created model is in a gradient descent direction of a previously created module loss function. A loss function describes a model's degree of unreliability. The greater the loss function, the more error-prone the model. In the GBDT, the loss function can continue to decrease in a direction of its gradient, so that the model can constantly improve. It is generally assumed that the model can be represented by the following function: P denotes a parameter, and may consist of multiple parameters P={p0, p1, p2 . . . }, F(x; P) denotes a function of x with parameter P, that is, a prediction function. A GBDT model is constructed by combining a plurality of models. Specifically, one or more GBDT vehicle insurance risk prediction algorithms (or referred to as vehicle insurance risk prediction models, where as previously described, a model can be regarded as an expression of an algorithm, known as vehicle insurance risk prediction algorithm) can be constructed by using corresponding prediction functions based on service requirements.

In an implementation of the present disclosure, the vehicle insurance risk prediction algorithm can include a prediction model constructed in the following manner:

S30: Collect a preset type of personal attribute samples; and

S32: Model a selected modeling target by using a gradient boosting decision tree, and determine a vehicle insurance risk prediction model, where the modeling target includes a difference between an actual modeling target value and a predicted modeling target value, a Gamma regression objective function is used as an objective function during modeling, and the actual modeling target value and the predicted modeling target value are obtained by means of calculation based on the attribute sample.

Figure 4:
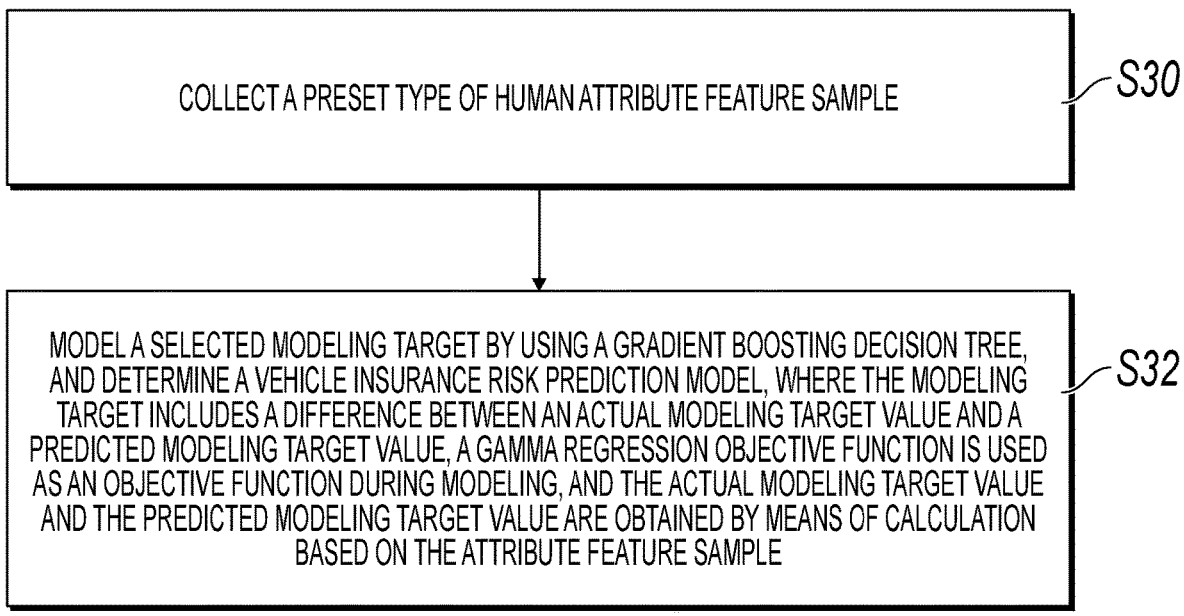
FIG. 4 is a schematic flowchart illustrating an implementation method for constructing a prediction model according to the method of the present disclosure.

FIG. 4 is a schematic flowchart illustrating another implementation method for constructing a prediction model according to a method provided in the present disclosure. The modeling target can include a certain parameter used in vehicle insurance risk prediction. Generally, information that can directly reflect the vehicle insurance risk of the vehicle insurance user is selected, such as the loss ratio. In one or more implementations of the present disclosure, the modeling target can include at least one of the following: a loss ratio, claim frequency, or a claim amount of the vehicle insurance user.

In a specific example, a difference between an actual loss ratio and a predicted loss ratio calculated using the policy data can be fitted. An actual loss ratio and a predicted loss ratio of a corresponding user can be obtained by calculation based on policy data of the vehicle insurance user. Assuming that y_i is an actual loss ratio for policy i and y^_i is a corresponding predicted loss ratio, the modeling target in the present example can include: d_i=y_i−y^_i+α, where α is a constant that is used to ensure that d_i>0. Since d_i follows Gamma distribution, the objective function is a Gamma regression objective function when the target is modeled by using the gradient boosting decision tree.

In another implementation, a function can be constructed using an actual and predicted quotient of the target as a modeling target when the GBDT is used for modeling. In a specific implementation, the vehicle insurance risk prediction algorithm can include a prediction model constructed in the following manner:

S40: Collect a preset type of personal attribute sample; and

S42: Model a selected modeling target by using a gradient boosting decision tree, and determine a vehicle insurance risk prediction model, where the modeling target includes a quotient of an actual modeling target value and a predicted modeling target value, a Tweedie regression objective function is used as an objective function during modeling, and the actual modeling target value and the predicted modeling target value are obtained by means of calculation based on the attribute sample.

Figure 5:
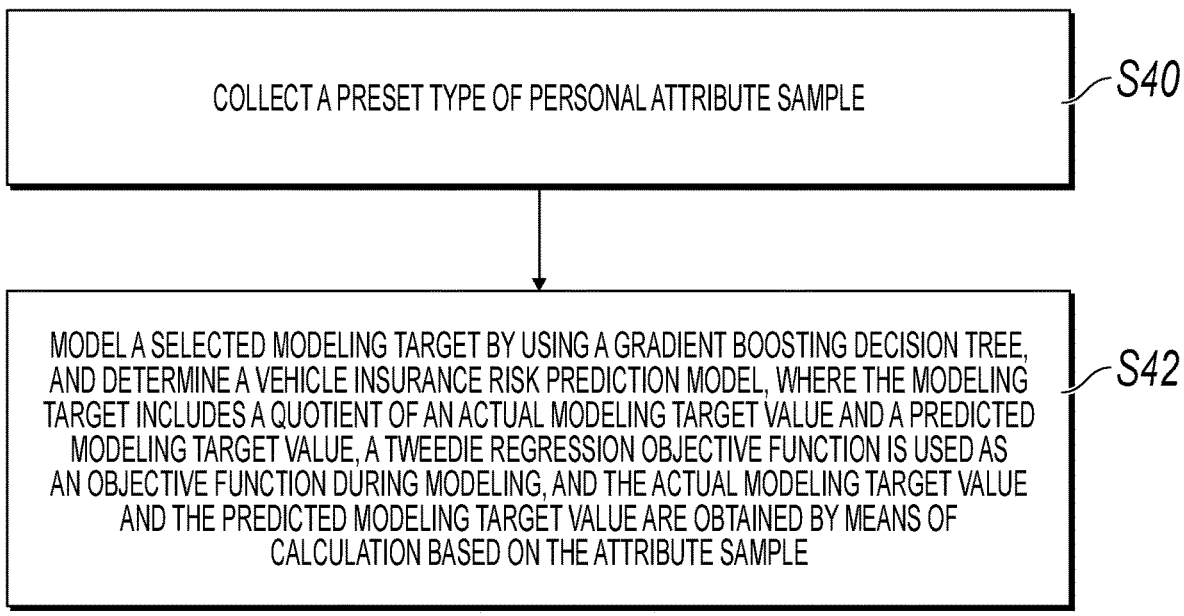
FIG. 5 is a schematic flowchart illustrating another implementation method for constructing a prediction model according to the method of the present disclosure.

FIG. 5 is a schematic flowchart illustrating another implementation method for constructing a prediction model according to the method of the present disclosure. In a specific example, a quotient of an actual loss ratio and a predicted loss ratio calculated using the policy data can be fitted. Assuming that y_i is an actual loss ratio of policy i, and y^_i is a corresponding predicted loss ratio, the modeling target can be set to r_i=y_i/y^_i. Since r_i follows Tweedie distribution, the objective function is a Tweedie regression objective function when the target is modeled by using the gradient boosting decision tree in the present example.

Further, feature processing can be performed on the above-mentioned variable data. The processed variable data can be input as new variable data into the aforementioned vehicle insurance risk prediction algorithm such as generalized linear model. For example, in the GBDT prediction model that uses the quotient of the actual loss ratio and the predicted loss ratio calculated using the policy data as the modeling target, the model can be used as the vehicle insurance risk prediction model to output a predicted vehicle insurance risk result of a loss ratio of the vehicle insurance user. The result can also be used as variable data for further excavating and sorting the aforementioned collected/obtained personal attribute variable information or the sample data. The variable data can be input to a vehicle insurance risk prediction model as new personal attribute information. In addition, if the obtained new variable data is a discrete variable, it can be first discretized by using a one-hot encoding method before inputting into the model. Specifically, for a discrete variable with n different values, the discrete variable is transformed into n variables with the value {0, 1}, which respectively indicate whether the original variable is a certain value. Continuous feature variable data can be directly used as input of the model.

In another implementation of the method provided in the present disclosure, a deep neural network can be used for modeling of the target. The vehicle insurance risk prediction algorithm is constructed in the following manner:

S50: Collect a preset type of personal attribute samples;

S52: Classify the personal attribute samples into feature samples in different value ranges based on corresponding feature types;

S54: Extract feature data from the feature samples based on N specified feature types, and generate an N-dimensional discrete feature vector;

S56: Map a single discrete feature vector of the feature samples to an M-dimensional continuous feature vector in a preset manner; and S58: Concatenate continuous feature vectors corresponding to the N-dimensional discrete features to form an (N*M)-dimensional continuous feature vector X, and use the continuous feature vector X as input of a selected deep neural network to construct a vehicle insurance risk prediction model.

Figure 6:
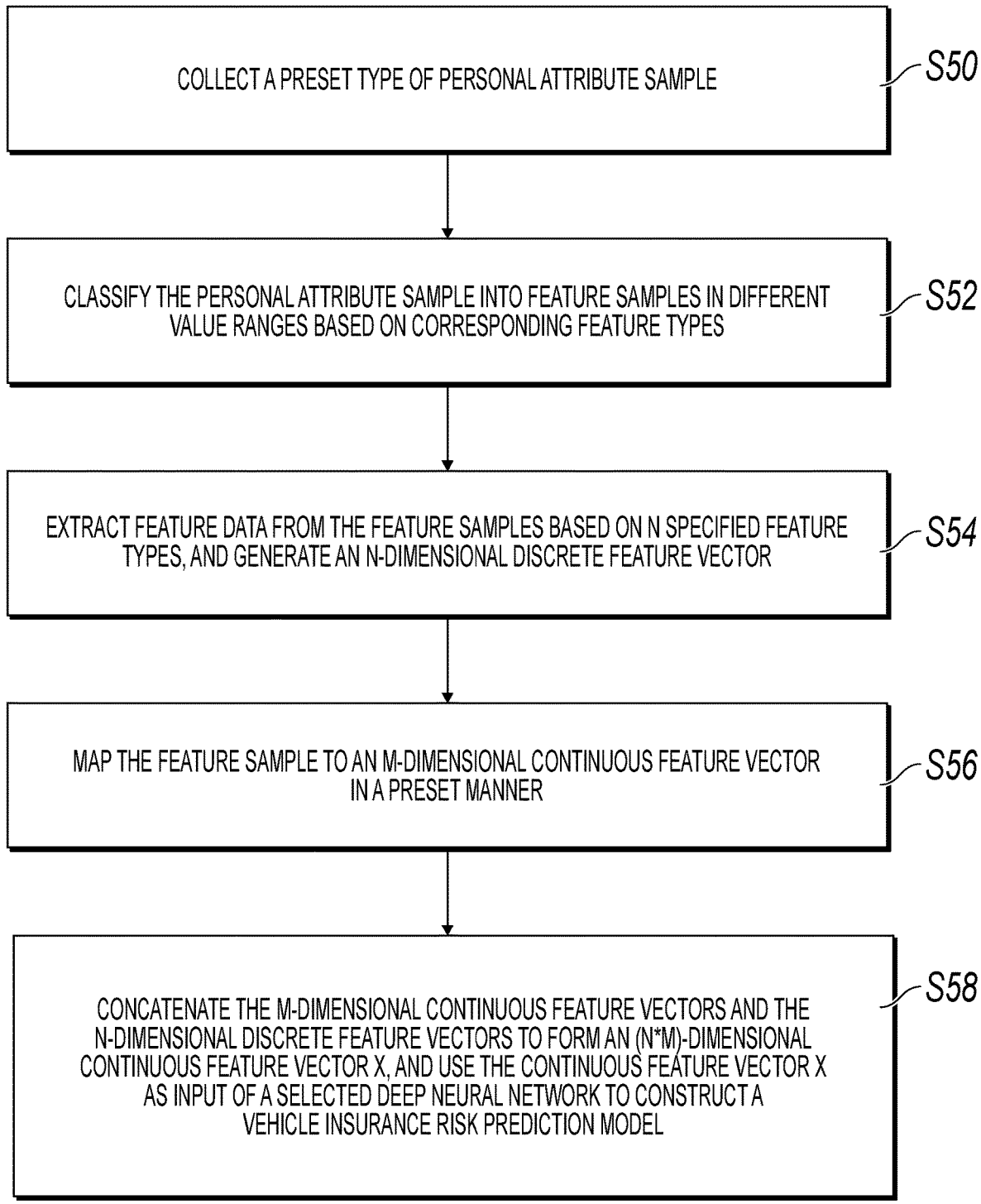
FIG. 6 is a schematic flowchart illustrating another implementation method for constructing a prediction model according to the method of the present disclosure.

FIG. 6 is a schematic flowchart of another implementation method for constructing a prediction model according to the method of the present disclosure. In the present implementation, a vehicle insurance risk prediction model can be constructed by using a deep neural network model. Specifically, a processing process of an example can include:

Collected personal attribute samples can be divided into K Bins (bin), such as Bin_gender male, Bin_gender female, Bin_average quick acceleration times between 1 and 5, Bin_average quick acceleration times between 6 and 10, Bin_average quick acceleration times more than 10, etc. For personal attribute samples, Bin features are extracted in N dimensions (for example, gender, quick acceleration times, etc.) to form an N-dimensional discrete feature vector [Bin#1, . . . , Bin#N] corresponding to the samples.

The Bin can be mapped to an M-dimensional continuous feature vector. The mapping process can be obtained by learning during neural network training, that is, a continuous vector is randomly initialized before training, and after the neural network is trained, the continuous vector is learned.

The M-dimensional continuous feature vectors corresponding to the N Bins are concatenated together, to form an (N*M)-dimensional continuous feature vector X, and the vector X is used as input to the deep neural network. The concatenation processing is performed on the continuous vectors (that is, each discrete vector can be mapped to an M-dimensional continuous vector, N discrete vectors can form N M-dimensional continuous vectors, and the N M-dimensional continuous vectors are concatenated to form one (N*M)-dimensional vector). A specific network layer structure of the deep neural network can be set based on a service scenario or a requirement of a constructed model. In some implementations, an output layer of the deep neural network can output a score that can represent a pure risk premium or a loss ratio for a vehicle insurance user, or can represent a ratio or difference relative to a payout ratio defined in a conventional GLM model. In the training of the deep neural network model, the parameters of the model can be randomly initialized, such as random sampling in a uniform distribution U [a, b]. The training objective function can be optimized using a stochastic gradient descent (Stochastic Gradient Descent) method with a minimized mean square error.

The abovementioned implementation describes an implementation in which a plurality of vehicle insurance risk prediction algorithms can be used to construct a vehicle insurance risk prediction model, so as to more accurately describe the customer risk and help the insurance industry to segment and manage risks, reduce costs, improve efficiency, and provide better services for vehicle insurance consumers.

In another implementation, at least two candidate vehicle insurance risk prediction algorithms are generated during construction of the vehicle insurance risk prediction algorithm. For example, when using a plurality of generalized linear models that use different construction targets, one or more generalized linear models, and prediction models based on the gradient boosting decision tree algorithm, or a plurality of vehicle insurance risk prediction models based on the deep neural network, the plurality of vehicle insurance risk prediction models can be evaluated by using statistics, to select a model suitable for the current service scenario. Therefore, in one or more implementations of the present disclosure, the method can further include:

Calculate a preset type of statistical indicator, where the statistical indicators include statistics used to indicate impact of output results of the candidate vehicle insurance risk prediction algorithms when the personal attribute information is used as an independent variable of the candidate vehicle insurance risk prediction algorithms; and Compare the statistical indicators, and then select a vehicle insurance risk prediction algorithm to be used from the candidate vehicle insurance risk prediction algorithms.

These statistical indicators can specifically include various types of statistics, such as a deviance, a log-likelihood function, an AIC, a BIC, a chi-square, a p-value, etc. These statistics can be obtained through calculation by using a fixed or deformed/transformed formula. In a specific example, processed variable fields can be input to a model, and significance of the variables and that of the model are checked and compared by using statistics such as a Deviance, a log-likelihood function, an AIC, and a BIC. Some of these statistical indicators can be used to determine whether a factor or a model is significant. In an implementation scenario of the present implementation, there can be a plurality of vehicle insurance risk prediction models, including the vehicle insurance risk prediction models described in the one or more of the above implementations. Through a number of statistical indicators, or combined with the analysis results of the operators, a model suitable for a service scenario can be selected from a plurality of candidate vehicle insurance risk prediction models.

In the present implementation, a plurality of generated candidate vehicle insurance prediction algorithms can be verified and compared based on one or more predetermined types of statistical indicators. From the variables affecting a specific variable, variables having significant impact and variables having insignificant impact can be identified. For example, some models are very sensible to credit data, and the quality of the credit has a great influence on a vehicle insurance risk result of the vehicle insurance user; while other models are not sensitive to the credit data of the vehicle insurance user. Based on this, a suitable vehicle insurance risk prediction model can be selected, so that the predicted vehicle insurance risk result can be more accurate.

The implementations in the present disclosure are all described in a progressive manner. The same or similar parts among the implementations can be referred to each other. Each implementation focuses on the difference from other implementations.

The specified implementations of the present disclosure have been described above. Other implementations fall within the scope of the following claims. In some cases, the actions or steps recited in the claims can be performed in a sequence different from that in the implementations and still achieve desirable results. In addition, the processes described in the figures do not necessarily require the particular order shown or sequential order, to achieve desirable results. In certain implementations, multitasking and parallel processing are also possible or may be advantageous.

In the vehicle insurance risk prediction method provided in the implementations of the present disclosure, a vehicle insurance risk prediction algorithm can be established by using a pre-collected and processed personal attribute information, and personal attribute information of the to-be-predicted vehicle insurance user is processed by using the pre-constructed vehicle insurance risk prediction algorithm, so as to predict impact of the vehicle insurance user on a vehicle risk from the perspective of a natural person. In the actual vehicle use, the impact of personal factors on vehicle insurance services, such as whether the vehicle is involved in an accident and a specific amount of the insurance payment, is generally greater. In the implementation solutions provided in the implementations of the present disclosure, vehicle risk prediction is performed by using the personal attribute information, to provide more accurate and reliable basis for vehicle insurance risk assessment, so that accuracy and reliability of vehicle insurance risk assessment can be effectively improved.

Figure 7:
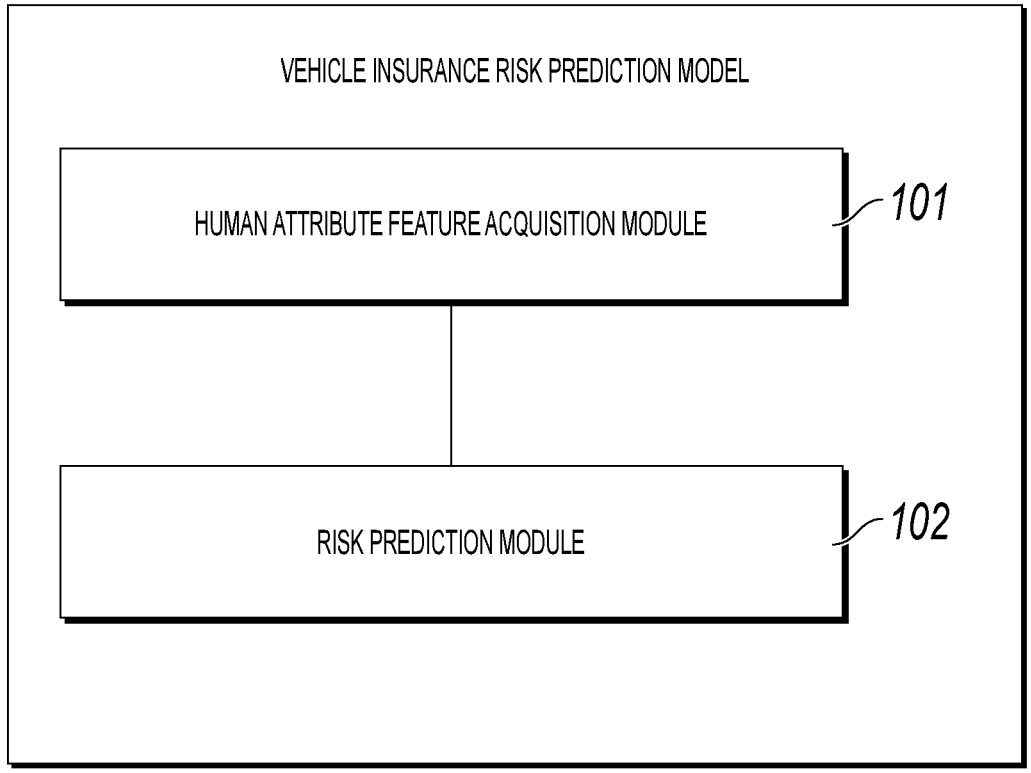
FIG. 7 is a schematic structural diagram illustrating a vehicle insurance risk prediction apparatus according to an implementation of the present disclosure.

Based on the above-mentioned vehicle insurance risk prediction method, the present disclosure further provides a vehicle insurance risk prediction apparatus. The apparatus can include a system (including a distributed system), software (application), modules, components, servers, clients, quantum computers, etc. using the method described in one or more implementations of the present disclosure and in combination with necessary implementation hardware. Based on the same inventive concept, the apparatus in an implementation provided in one or more implementations of the present disclosure is described in the following implementation. Because the implementation solution of the apparatus for resolving the problem is similar to the method, the implementation of one or more specific apparatuses in the present disclosure may refer to the implementation of the foregoing method, and details are not repeatedly described here. The term "unit" or "module" used below can combine software and/or hardware of a predetermined function. Although the apparatus described in the following implementations is preferably implemented in software, the implementation of hardware or a combination of software and hardware is also possible and contemplated. Specifically, FIG. 7 is a schematic structural diagram illustrating a vehicle insurance risk prediction apparatus according to an implementation of the present disclosure. As shown in FIG. 7, the apparatus can include: a personal attribute acquisition module 101, configured to obtain personal attribute information of a vehicle insurance user, where the personal attribute information includes at least one kind of natural attribute information, social attribute information, or behavior data of a natural person; and a risk prediction module 102, configured to process the personal attribute information by using a pre-constructed vehicle insurance risk prediction algorithm, to obtain a predicted vehicle insurance risk result of the vehicle insurance user.

In another implementation of the apparatus in the present disclosure, the risk prediction module 102 can include: a sample acquisition unit, configured to collect a preset type of personal attribute samples; and a first model construction unit, configured to: determine a generalized linear model to be used and a modeling target of the generalized linear model; and use data that includes the personal attribute sample as input of the generalized linear model, model the modeling target, and determine a vehicle insurance risk prediction model, where the vehicle insurance risk prediction model includes at least one output result that indicates a vehicle insurance risk of the vehicle insurance user.

In another implementation of the apparatus in the present disclosure, the risk prediction module 102 can include: a sample acquisition unit, configured to collect a preset type of personal attribute samples; and a second model construction unit, configured to: model a selected modeling target by using a gradient boosting decision tree, and determine a vehicle insurance risk prediction model, where the modeling target includes a difference between an actual modeling target value and a predicted modeling target value, a Gamma regression objective function is used as an objective function during modeling, and the actual modeling target value and the predicted modeling target value are obtained by means of calculation based on the attribute sample.

In another implementation of the apparatus in the present disclosure, the risk prediction module 102 can include: a sample acquisition unit, configured to collect a preset type of personal attribute samples; and a third model construction unit, configured to: model a selected modeling target by using a gradient boosting decision tree, and determine a vehicle insurance risk prediction model, where the modeling target includes a quotient of an actual modeling target value and a predicted modeling target value, a Tweedie regression objective function is used as an objective function during modeling, and the actual modeling target value and the predicted modeling target value are obtained by means of calculation based on the attribute sample.

In another implementation of the apparatus in the present disclosure, the risk prediction module 102 can include: a sample acquisition unit, configured to collect a preset type of personal attribute samples; a sample classification unit, configured to classify the personal attribute samples into feature samples in different value ranges based on corresponding feature types; a discrete vector unit, configured to: extract feature data from the feature samples based on N specified feature types, and generate an N-dimensional discrete feature vector; a continuous vector unit, configured to map a single discrete feature vector of the feature sample to an M-dimensional continuous feature vector in a preset manner; and a fourth model construction unit, configured to: concatenate continuous feature vectors corresponding to the N-dimensional discrete features to form an (N*M)-dimensional continuous feature vector X, and use the continuous feature vector X as input of a selected deep neural network to construct a vehicle insurance risk prediction model, where N≥1 and M≥1.

As described in the previous method implementation, the modeling target in the apparatus can include at least one of the following: a loss ratio, claim frequency, or a claim amount of the vehicle insurance user.

In another implementation of the apparatus, the preset type of personal attribute samples can include at least one type of variable data of the following: a driving habit, a professional characteristic, an identity characteristic, credit history, a consumption habit, or stability.

Figure 8:
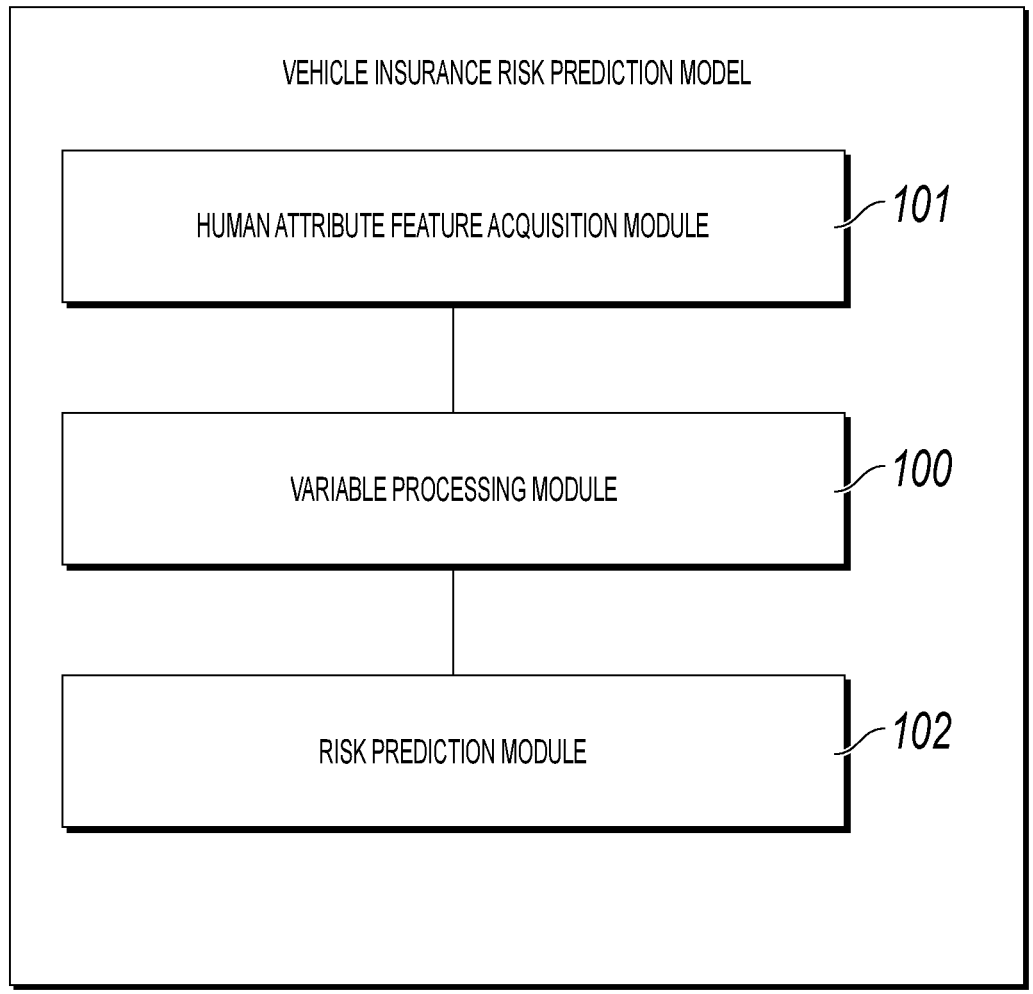
FIG. 8 is a schematic structural diagram illustrating another vehicle insurance risk prediction apparatus according to an implementation of the present disclosure.

FIG. 8 is a schematic structural diagram illustrating a vehicle insurance risk prediction apparatus according to another implementation of the present disclosure. As shown in FIG. 8, the apparatus can further include: a variable processing module 100, configured to: after the variable data of the personal attribute information is obtained, process the variable data, where the variable processing module 100 executes at least one of the following operations:

setting a weight of the variable data;
supplementing an incomplete value in the variable data;
determining a data use selection manner of repeated variable data;
processing interaction effect between the variable data; and
generating new variable data based on the variable data; where
correspondingly, that the risk prediction module 102 processes the personal attribute information by using the pre-constructed vehicle insurance risk prediction algorithm includes: processing the processed variable data by using the pre-constructed vehicle insurance risk prediction algorithm.

Figure 9:
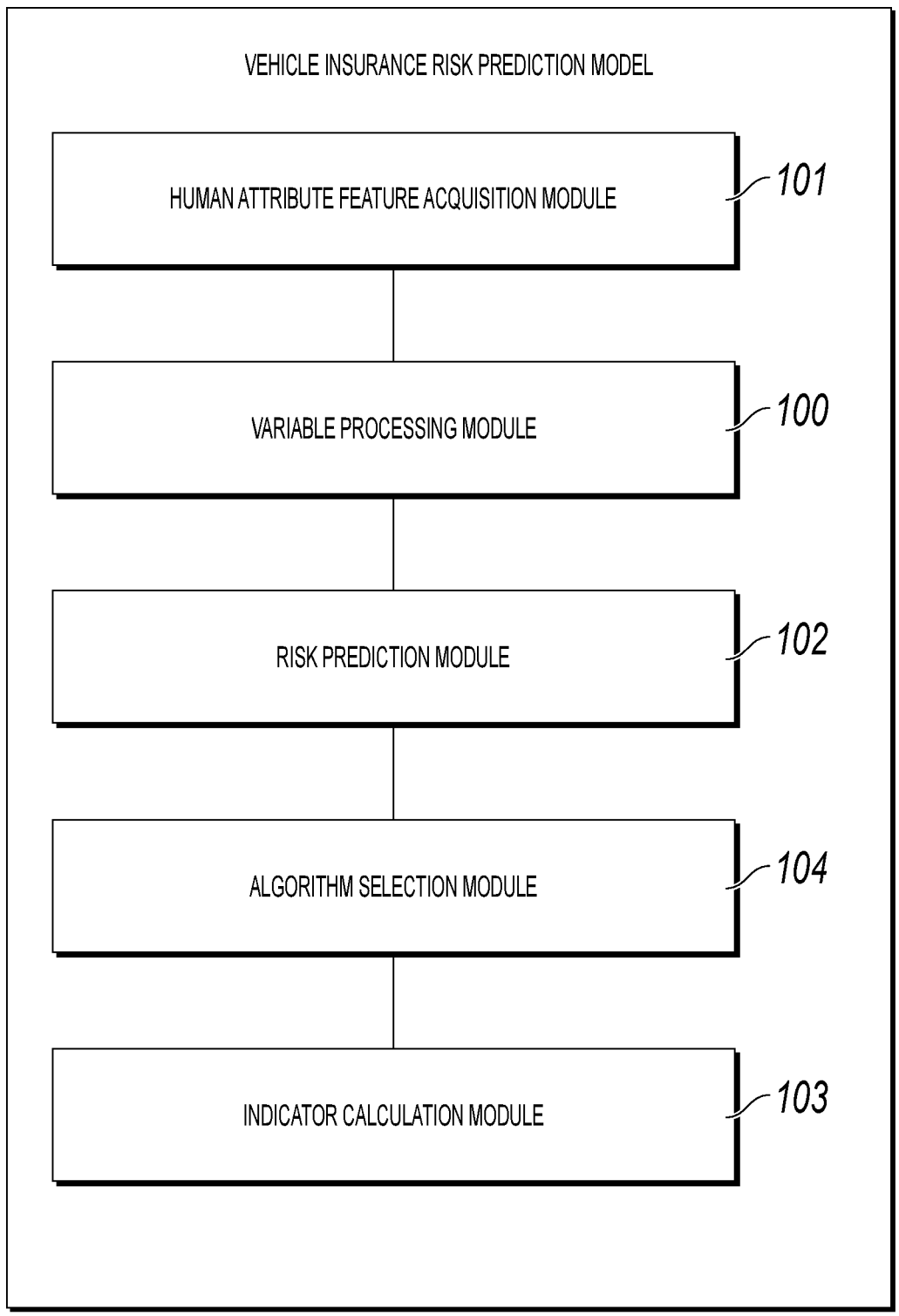
FIG. 9 is a schematic structural diagram illustrating another vehicle insurance risk prediction apparatus according to an implementation of the present disclosure.

FIG. 9 is a schematic structural diagram illustrating a vehicle insurance risk prediction apparatus according to another implementation of the present disclosure. As shown in FIG. 9, the apparatus can further include: an indicator calculation module 103, configured to: if at least two candidate vehicle insurance risk prediction algorithms are generated during construction of the vehicle insurance risk prediction algorithm, calculate a preset type of statistical indicator, where the statistical indicators include statistics used to indicate impact of output results of the candidate vehicle insurance risk prediction algorithms when the personal attribute information is used as an independent variable of the candidate vehicle insurance risk prediction algorithms; and an algorithm selection module 104, configured to: compare the statistical indicators, and then select a vehicle insurance risk prediction algorithm to be used from the candidate vehicle insurance risk prediction algorithms.

The vehicle insurance risk prediction method provided in one or more implementations of the present disclosure can be implemented in the computer by the processor executing corresponding program instructions, such as using the C++ language of the windows operating system on the PC side, or using a designed language of a corresponding application in another system such as Linux, Android or iOS, and implemented based on the quantum computer processing logic. Specifically, in an implementation of the vehicle insurance risk prediction apparatus provided in one or more implementations of the present disclosure, the apparatus can include a processor and a memory configured to store an executable instruction of the processor, and the processor executes the instruction to implement: obtaining personal attribute information of a vehicle insurance user, where the personal attribute information includes at least one kind of natural attribute information, social attribute information, or behavior data of a natural person; and processing the personal attribute information by using a pre-constructed vehicle insurance risk prediction algorithm, to obtain a predicted vehicle insurance risk result of the vehicle insurance user.

It should be noted that the apparatus described in the present disclosure can further include other implementations based on the description of the related method implementations. In the present disclosure, the implementations are described in a progressive manner. Reference may be made to each other for a same or similar part of the implementations. Each implementation focuses on a difference from other implementations. In particular, for the hardware plus program type implementation, since it is basically similar to the method implementation, the description is relatively simple, and the relevant parts may refer to the partial description of the method implementation.

The specified implementations of the present disclosure have been described above. Other implementations fall within the scope of the following claims. In some cases, the actions or steps recited in the claims can be performed in a sequence different from that in the implementations and still achieve desirable results. In addition, the processes described in the figures do not necessarily require the particular order shown or sequential order, to achieve desirable results. In certain implementations, multitasking and parallel processing are also possible or may be advantageous.

The vehicle insurance risk prediction apparatus provided in the implementations of the present disclosure can establish a vehicle insurance risk prediction algorithm by using a pre-collected and processed personal attribute information, and process personal attribute information of the to-be-predicted vehicle insurance user by using the pre-constructed vehicle insurance risk prediction algorithm, so as to predict impact of the vehicle insurance user on a vehicle risk from the perspective of a natural person. In actual vehicle use, the impact of personal factors on vehicle insurance services, such as whether the vehicle is involved in an accident and a specific amount of insurance payment, is generally greater. In the implementation solutions provided in the implementations of the present disclosure, vehicle risk prediction is performed by using the personal attribute information, to provide more accurate and reliable basis for vehicle insurance risk assessment, so that accuracy and reliability of vehicle insurance risk assessment can be effectively improved.

Figure 10:
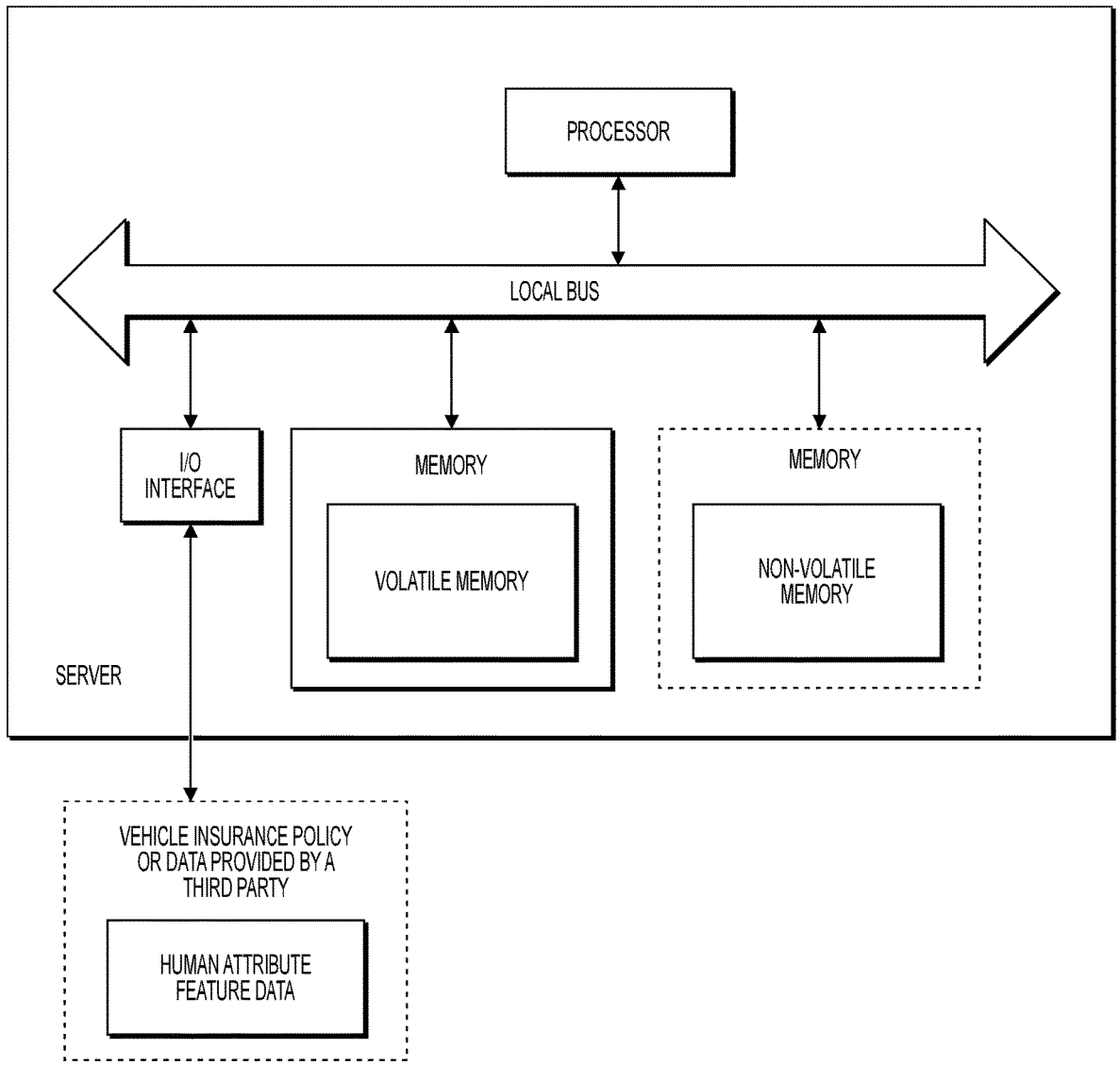
FIG. 10 is a schematic structural diagram illustrating a server according to an implementation of the present disclosure.

The foregoing described apparatus or method can be used in vehicle insurance risk prediction servers of a plurality of service systems, for example, a server of an insurance company service system or a server of a service provider that provides a vehicle insurance risk assessment score of a vehicle insurance user to the insurance company. The server can include a single server, a server cluster, a system (including a distributed system), software (application), a logic gate circuit apparatus, a quantum computer, etc. that use one or more methods of the present disclosure or the apparatus in one or more implementations, and a terminal apparatus in combination with necessary implementation hardware. FIG. 10 is a schematic structural diagram illustrating a server according to an implementation of the present disclosure. Specifically, one or more implementations of the present disclosure provide a server, including at least one processor and a memory configured to store an executable instruction of the processor, and the processor executes the instruction to implement the data processing steps in any one of the previous method implementations.

In the vehicle insurance risk prediction method and apparatus, and a server provided in the implementations of the present disclosure, a vehicle insurance risk prediction algorithm can be established by using a pre-collected and processed personal attribute information, and personal attribute information of the to-be-predicted vehicle insurance user is processing by using the pre-constructed vehicle insurance risk prediction algorithm, so as to predict impact of the vehicle insurance user on a vehicle risk from the perspective of a natural person. In actual vehicle use, the impact of personal factors on vehicle insurance services, for example, whether the vehicle is involved in an accident and a specific amount of insurance payment, is generally greater. In the implementation solutions provided in the implementations of the present disclosure, vehicle risk prediction is performed by using the personal attribute information, to provide more accurate and reliable basis for vehicle insurance risk assessment, so that accuracy and reliability of vehicle insurance risk assessment can be effectively improved.

Although one or more of the contents of the present disclosure refers to the types of personal attribute information/samples, the respective data mining and processing methods of the variable data, the generalized linear model, the way in which the objective function is constructed by using the GBDT, the implementation in which the loss ratio is used as a construction target, and descriptions of data setting, acquisition, interaction, calculation and determining, however, one or more implementations of the present disclosure do not necessarily conform to industry communication standards, standard blockchain data storage, computer processing and storage rules, or the situation described in one or more implementations of the present disclosure. Some industry standards, self-defined implementation solutions, or solutions obtained after slight modification based on the implementation of the implementations can also achieve the same, equivalent, similar, or transformed but predictable implementation effect of the previous implementations. These modified or transformed implementations obtained by means of data acquisition, storing, determining and processing can still fall within the scope of one or more optional implementation solutions of the present disclosure.

In the 1990s, improvements of a technology can be clearly distinguished between hardware improvements (for example, improvements to a circuit structure such as a diode, a transistor, a switch, etc.) and software improvements (improvements to a method procedure). However, with the development of technology, improvements of many method procedures can be considered as direct improvements of hardware circuit structures. Designers almost all program an improved method procedure to a hardware circuit, to obtain a corresponding hardware circuit structure. Therefore, it does not mean that the improvement of a method procedure cannot be implemented by using a hardware entity module. For example, a programmable logic device (PLD), such as a field programmable gate array (FPGA), is a type of an integrated circuit whose logic function is determined by component programming executed by a user. The designers perform voluntary programming to "integrate" a digital system into a single PLD without requiring a chip manufacturer to design and prepare a dedicated integrated circuit chip. In addition, instead of making integrated circuit chip manually, the programming is mostly implemented by using "logic compiler software, which is similar to the software compiler used to write programs. Original code before compiling is also written in a specific programming language, which is referred to as Hardware Description Language (HDL). There is more than one kind of HDLs, but there are many kinds of HDLs, such as ABEL (Advanced Boolean Expression Language), AHDL (Altera Hardware Description Language), Confluence, CUPL (Cornell University Programming Language), HDCal, JHDL (Java Hardware Description Language), Lava, Lola, MyHDL, PALASM, RHDL (Ruby Hardware Description Language), etc. Currently, VHDL (Very-High-Speed Integrated Circuit Hardware Description Language) and Verilog are most commonly used. A person skilled in the art should also understand that a method procedure only needs to be logically programmed, and programmed to the integrated circuit by using the foregoing hardware description languages, so that a hardware circuit that implements the logical method process can be easily obtained.

The controller can be implemented in any suitable manner, for example, the controller can take the form of, for example, a microprocessor or processor and a computer-readable medium storing computer-readable program code (for example, software or firmware) executable by the processor, a logic gate, a switch, an application specific integrated circuit (ASIC), a programmable logic controller and an embedded microcontroller. Examples of the controller include, but are not limited to, the following microcontrollers: ARC 625D, Atmel AT91SAM, Microchip PIC18F26K20 and Silicone Labs C8051F320. The memory controller can also be implemented as part of the memory control logic. A person skilled in the art will also appreciate that, in addition to implementing the controller in purely computer-readable program code, it is also possible to implement the controller in logic gates, switches, application specific integrated circuits, programmable logic controllers, and embedded Microcontrollers and other forms to achieve the same function. Such a controller can thus be considered as a hardware component and devices included therein for implementing various functions can also be considered as structures within the hardware component. Alternatively, an apparatus configured to implement various functions can be considered as both a software module implementing the method and a structure in the hardware component.

The system, the apparatus, the module or the unit illustrated in the previous implementations can be specifically implemented by a computer chip or an entity or implemented by a product with a certain function. A typical implementation device is a computer. Specifically, the computer can be, for example, a personal computer, a laptop computer, a vehicle-mounted man-machine interaction device, a cellular phone, a camera phone, a smartphone, a personal digital assistant, a media player, a navigation device, an email device, a game console, a tablet computer, a wearable device, or a combination of any of these devices.

Although one or more implementations of the present disclosure provide method steps as described in the implementations or flowcharts, more or fewer steps can be included based on conventional or non-inventive means. The sequence of steps listed in the implementations is only one of many step execution sequences, and does not represent a unique execution sequence. In practice, when an apparatus or a terminal product executes steps, the execution can be performed in a sequence shown in the implementations or the accompanying drawings, or performed in parallel (for example, a parallel processor or a multithread environment, or even a distributed data processing environment). Moreover, the terms "include", "comprise", or any other variant is intended to cover a non-exclusive inclusion, so that a process, a method, a product, or an apparatus that includes a list of elements not only includes those elements, but also includes other elements that are not expressly listed, or further includes elements inherent to such process, method, product, or apparatus. When there are no more restrictions, the existence of additional identical elements in the process, method, product, or apparatus that includes the element is not precluded.

For ease of description, the foregoing apparatus is described by dividing the functions into various modules. Certainly, when one or more modules in the present disclosure are implemented, functions of the modules can be implemented in one or more types of software and/or hardware, or modules that implement the same function can be implemented by using a combination of a plurality of sub-modules or sub-units. For example, the described apparatus implementation is merely exemplary. For example, the unit division is merely a logical function division and may be other divisions in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

Those persons skilled in the art will also appreciate that, in addition to implementing the controller in purely computer-readable program code, it is entirely possible to implement the controller in logic gates, switches, application specific integrated circuits, programmable logic controllers, and embedded microcontrollers and other forms to achieve the same function. Such a controller can thus be considered as a hardware component, and devices included therein for implementing various functions can also be considered as structures in the hardware component. Alternatively, an apparatus for implementing various functions can be considered as both a software module implementing the method and a structure in the hardware component.

The present disclosure is described with reference to the flowcharts and/or block diagrams of the method, the device (system), and the computer program product according to the implementations of the present disclosure. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer-readable memory that can instruct the computer or any other programmable data processing device to work in a specific manner, so that the instructions stored in the computer readable memory can generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the other programmable device provide steps for implementing a specific function in one or more processes in the flowcharts and/or in one or more blocks in the block diagrams.

In a typical configuration, the computer device includes one or more processors (CPU), an input/output interface, a network interface, and a memory.

The memory may include a non-persistent memory, a random access memory (RAM), a non-volatile memory, and/or another form that are in a computer readable medium, for example, a read-only memory (ROM) or a flash memory (flash memory). The memory is an example of the computer-readable medium.

The computer-readable medium includes persistent, non-persistent, movable, and unmovable media that may implement information storage by using any method or technology. Information may be a computer-readable instruction, a data structure, a program module, or other data. An example of a computer storage medium includes but is not limited to a phase change memory (PRAM), a static random access memory (SRAM), a dynamic random access memory (DRAM), another type of random access memory (RAM), a read-only memory (ROM), an electrically erasable programmable read-only memory (EEPROM), a flash memory or another memory technology, a compact disc read-only memory (CD-ROM), a digital versatile disc (DVD) or other optical storage, a cassette magnetic tape, tape and disk storage or another magnetic storage device or any other non-transmission media that may be configured to store information that a computing device can access. Based on the definition in the present disclosure, the computer readable medium does not include transitory computer readable media (transitory media), such as a modulated data signal and a carrier.

A person skilled in the art should understand that one or more implementations of the present disclosure can be provided as a method, a system, or a computer program product. Therefore, the one or more implementations of the present disclosure can use a form of hardware only implementations, software only implementations, or implementations with a combination of software and hardware. Moreover, the one or more implementations of the present disclosure can use a form of a computer program product that is implemented on one or more computer-usable storage media (including but not limited to a disk memory, a CD-ROM, an optical memory, and the like) that include computer-usable program code.

The one or more implementations of the present disclosure can be described in the general context of executable computer instructions executed by a computer, for example, a program module. Generally, the program unit includes a routine, a program, an object, a component, a data structure, and the like for executing a particular task or implementing a particular abstract data type. The one or more implementations of the present disclosure can also be practiced in distributed computing environments that tasks are performed by remote processing devices that are connected by using a communications network. In a distributed computing environment, the program module may be located in both local and remote computer storage media including storage devices.

In the present disclosure, the implementations are described in a progressive manner. Reference may be made to each other for the same or similar part of the implementations. Each implementation focuses on a difference from other implementations. Especially, since the system implementation is similar to the method implementations, therefore is described briefly, and for relevant parts, reference may be made to partial descriptions of the method implementations. In the description of the present disclosure, descriptions of the terms "an implementation", "some implementations", "example", "specific example", "some examples", etc, indicates that the specific features, structures, materials, or characteristics described with reference to the implementation or example can be included in at least one implementation or example of the present disclosure. In the present disclosure, the foregoing is described not necessarily for the same implementation or example. In addition, the described specific features, structures, materials, or characteristics may be combined in a proper manner in any one or more of the implementations or examples. In addition, a person skilled in the art may integrate or combine different implementations or examples and characteristics of different implementations or examples described in the present disclosure without mutual contradiction.

The previous description is only one or more implementations of the present disclosure and is not intended to limit the one or more implementations of the present disclosure. For a person skilled in the art, the one or more implementations of the present disclosure can have various modifications and variations. Any modification, equivalent replacement, or improvement made within the spirit and principle of the present disclosure shall fall within the scope of the claims of the present disclosure.

Figure 11:
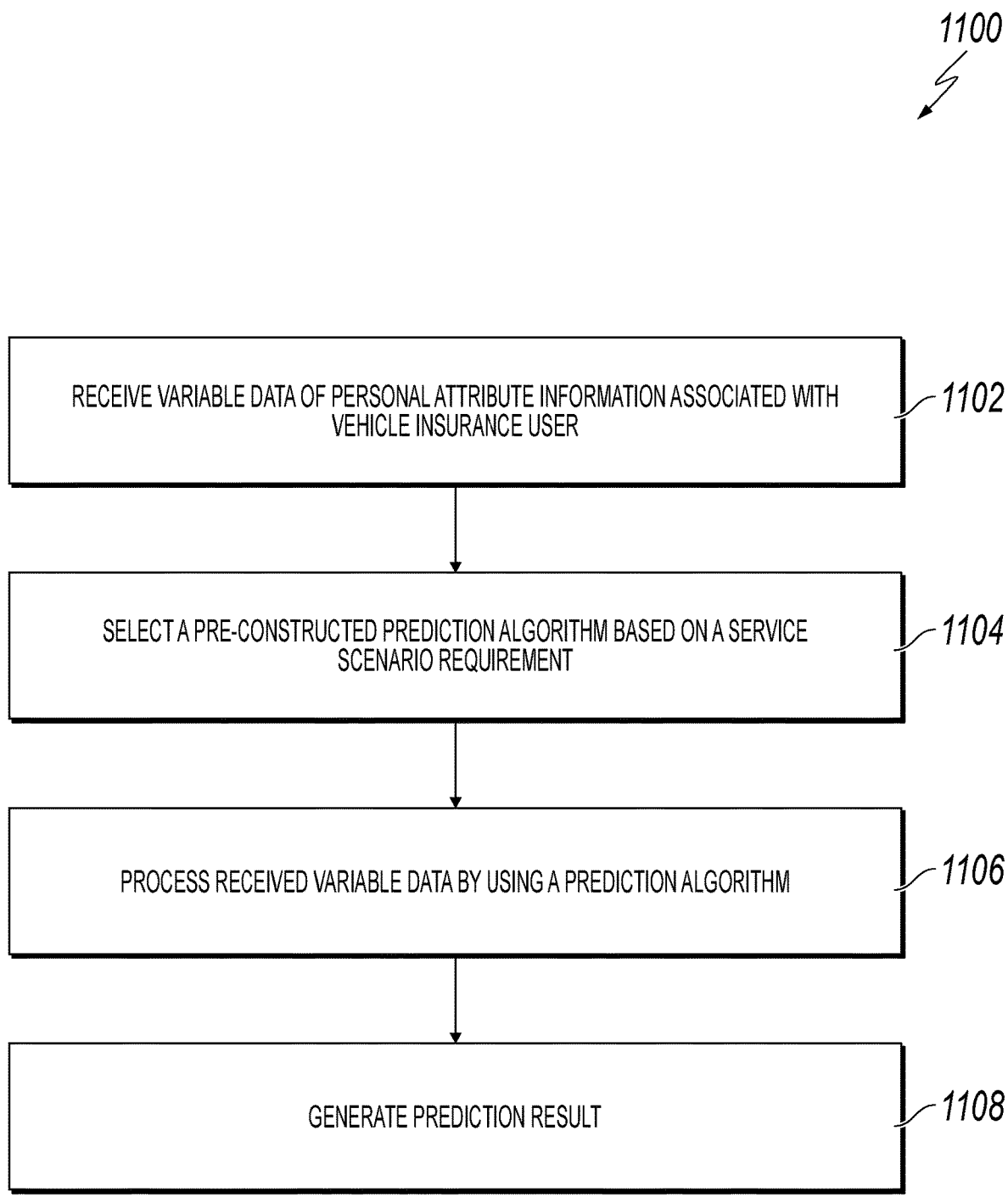
FIG. 11 is a flowchart illustrating an example of a computer-implemented method for computer data processing, according to an implementation of the present disclosure.

FIG. 11 is a flowchart illustrating an example of a computer-implemented method 1100 for computer data processing, according to an implementation of the present disclosure. For clarity of presentation, the description that follows generally describes method 1100 in the context of the other figures in this description. However, it will be understood that method 1100 can be performed, for example, by any system, environment, software, and hardware, or a combination of systems, environments, software, and hardware, as appropriate. In some implementations, various steps of method 1100 can be run in parallel, in combination, in loops, or in any order.

At 1102, a plurality of variable data of personal attribute information associated with at least one vehicle insurance user is received at a prediction server and from at least one different data source. The personal attribute information can be obtained through the vehicle insurance service policy data, or obtained by a terminal application when authorized, or obtained by receiving data information provided by a third party.

The personal attribute information can include information associated with personal attributes or data associated with personal behaviors. In some implementations, the personal attribute generally belongs to a natural person, for example, an owner of a vehicle. In some implementations, the personal attribute information of the vehicle insurance user can include natural attribute information, social attribute information and behavior attribute information of a natural person. The natural attribute information can include age, gender, physical condition, and other attribute information associated with the biological characteristics of the person. The social attribute information can include labor, social interaction, and various social relations formed by the vehicle insurance user. The behavioral data can include statistical information generated by a certain behavior of a vehicle insurance user, such as driving habits. From 1102, method 1100 proceeds to 1104.

In some implementations, after the variable data of the personal attribute information is obtained, the variable data can further be sorted and processed, the processing can include at least one of the following: setting a weight of the variable data, supplementing an incomplete value in the variable data, determining a data use selection manner of repeated variable data, processing interaction effect between the variable data, or generating new variable data based on the variable data. From 1102, method 1100 proceeds to 1104.

At 1104, a pre-constructed prediction algorithm is selected, based on a service scenario requirement. In some implementations, more than one service scenario requirements can be considered. For example, a service scenario requirement associated with a vehicle insurance company can be a requirement of a positive or good driving habit indication associated with a driver. In this case, the collected variable data of a driving habit type can more directly reflect a vehicle driving risk of a vehicle insurance user and, accordingly, can have a greater impact on the vehicle insurance service provided by the vehicle insurance company. In this case, a relatively large weight of the variable data of the driving habit type can be set. In some service scenarios, the variable data can further be sorted based on the specified variable weights. Other implementations can take into account one or more other service scenario requirements. In some implementations, a linear prediction model, a network prediction model, a calculation formula, or a self-defined fitting algorithm can be selected for the vehicle insurance risk pre-constructed prediction algorithm based on the service scenario requirement. From 1104, method 1100 proceeds to 1106.

At 1106, the plurality of variable data are processed at one or more processor, by using the pre-constructed prediction algorithm. In one or more implementations of the present disclosure, after variable processing and excavation are completed, a vehicle insurance risk pre-constructed prediction algorithm applicable to a service scenario can be selected for modeling or training. A modeled or trained vehicle insurance risk pre-constructed prediction algorithm can be used to perform vehicle insurance risk prediction for a to-be-predicted vehicle insurance user. A predictive model can be trained by sampling data of personal attribute information, and then using the trained predictive model to construct a vehicle insurance risk prediction model.

In one or more implementation of the present disclosure, a generalized linear model (GLM) can be used for modeling, and a modeling result can reflect the influence of personal factors on the risk of vehicle insurance. Specifically, in the vehicle insurance risk prediction method provided in one or more implementations of the present disclosure, the vehicle insurance risk pre-constructed prediction algorithm can include a prediction model constructed in the following manner: collecting a preset type of personal attribute sample; determining a generalized linear model to be used and a modeling target of the generalized linear model; and using data that includes the personal attribute sample as input of the generalized linear model, model the modeling target, and determine a vehicle insurance risk prediction model, where the vehicle insurance risk prediction model includes at least one output result that indicates a vehicle insurance risk of the vehicle insurance user.

In a specific example of using a generalized linear model to model a target in the present disclosure, modeling can be performed by using a loss ratio as a target. Because in most cases, vehicle insurance policies do not make insurance claims, therefore, in the present implementation, the Tweedie distribution can be selected based on the situation.

In one or more implementations of the present disclosure, a gradient boosting decision tree (GBDT) can be used to model a target for constructing a vehicle insurance risk prediction model. Based on the gradient boosting decision tree, each time, a created model is in a gradient descent direction of a previously created model loss function. A loss function describes a model's degree of unreliability. The greater the loss function, the more error-prone the model.

In an implementation of the present disclosure, the vehicle insurance risk pre-constructed prediction algorithm can include a prediction model constructed in the following manner: collecting a preset type of personal attribute samples; modeling a selected modeling target by using a gradient boosting decision tree, and determining a vehicle insurance risk prediction model, where the modeling target includes a difference between an actual modeling target value and a predicted modeling target value, a Gamma regression objective function is used as an objective function during modeling, and the actual modeling target value and the predicted modeling target value are obtained by means of calculation based on the attribute sample.

In another implementation, a function can be constructed using an actual and predicted quotient of the target as a modeling target when the GBDT is used for modeling. In a specific implementation, the vehicle insurance risk pre-constructed prediction algorithm can include a prediction model constructed in the following manner: collecting a preset type of personal attribute sample; and modelling a selected modeling target by using a gradient boosting decision tree, and determine a vehicle insurance risk prediction model, where the modeling target includes a quotient of an actual modeling target value and a predicted modeling target value, a Tweedie regression objective function is used as an objective function during modeling, and the actual modeling target value and the predicted modeling target value are obtained by means of calculation based on the attribute sample.

In another implementation, a deep neural network can be used for modeling of the target. Constructing the vehicle insurance risk pre-constructed prediction algorithm includes the following steps: collecting a preset type of personal attribute samples; classifying the personal attribute samples into feature samples in different value ranges based on corresponding feature types; extracting feature data from the feature samples based on N specified feature types, and generating an N-dimensional discrete feature vector; mapping a single discrete feature vector of the feature samples to an M-dimensional continuous feature vector in a preset manner; and concatenating continuous feature vectors corresponding to the N-dimensional discrete features to form an (N*M)-dimensional continuous feature vector X, and using the continuous feature vector X as input of a selected deep neural network to construct a vehicle insurance risk prediction model. From 1106, method 1100 proceeds to 1108.

At 1108, at least one predicted result is generated. The vehicle insurance risk pre-constructed prediction algorithm can output a predicted vehicle insurance risk result of a vehicle insurance user. Specifically, the vehicle insurance risk prediction can include a score representing the risk of the vehicle insurance user, the type of the risk, the probability of claim, the range of compensation payout, the group of risk population, and other types of vehicle insurance risk prediction results. After 1108, method 1100 stops.

Implementations of the present application can solve technical problems in pre-constructed prediction-algorithm-based attribute data processing. Traditionally, vehicle insurance companies rely mainly on the vehicle owner's own attribute information for pricing and modeling, to develop corresponding vehicle insurance services for different insured vehicles, and to provide the service to users. The attribute information includes, for example, the appearance, the age of the vehicle, and the mileage of the vehicle. However, in a vehicle insurance business, other factors can also affect whether the vehicle may be involved in an accident and a particular claim amount. In some cases, these factors can include the natural environment of the location of the vehicle and the condition of the road the vehicle often travels. Therefore, if an auto insurance risk is assessed only based on the vehicle's attribute information, the assessment can have significant limitations and the risk identification will not be sufficiently compensated. As such, auto insurance underwriting and pricing accuracy of the insurance company is reduced. In addition, different insurance companies use different auto insurance standard scores when formulating auto insurance operation services. Even for the same insured-vehicle information, due to differences in vehicle company background, service composition, or market trends, underwritten services provided by different insurance companies usually differ significantly. What is needed is a technique to bypass these problems in the conventional methods, and providing a more accurate and unified solution for a pre-constructed prediction algorithm based attribute data processing on processing attribute data.

Implementation of the present application provide methods and apparatuses for improving data processing pre-constructed prediction algorithm based attribute data processing based on processing attribute data. According to these implementations, in addition to the vehicle's attribute information, the present application also uses attribute information to a person (for example, natural attribute information, social attribute information, or behavioral attribute information). Further, the received attribute data can be further sorted and processed, and the variable data may be further mined and supplemented based on a specified processing rule, to increase the accuracy of the final auto insurance standard score. Moreover, a prediction result for the vehicle insurance user is generated by using a pre-constructed prediction algorithm (for example, a prediction model or a trained neural network) for transforming, converting, or weighting the attribute data, resulting a more uniformed result of the categorized value.

In some implementations, the described methods and apparatuses can reduce data processing for service providers by migrating a substantive amount of processing to a centralized prediction server. The received personal attribute information can be further processed (for example, using normalization or processing of attribute data to a same order of magnitude) to increase, for example, computer memory utilization, data storage, computer processing by a microprocessor, or transmission across a network. Moreover, the predicted result is generated by using a pre-constructed prediction algorithm selected based on a service scenario requirement executed in the centralized prediction server; resulting a more uniform predicted result. The centralized prediction server can also be configured, for example, to save computer processing cycles, computer memory usage, and network bandwidth when compared to processing the described data in multiple different locations (that is, at separate service providers) and transmitting result data across a network(s) for subsequent processing to the centralized prediction server.

Embodiments and the operations described in this specification can be implemented in digital electronic circuitry, or in computer software, firmware, or hardware, including the structures disclosed in this specification or in combinations of one or more of them. The operations can be implemented as operations performed by a data processing apparatus on data stored on one or more computer-readable storage devices or received from other sources. A data processing apparatus, computer, or computing device may encompass apparatus, devices, and machines for processing data, including by way of example a programmable processor, a computer, a system on a chip, or multiple ones, or combinations, of the foregoing. The apparatus can include special purpose logic circuitry, for example, a central processing unit (CPU), a field programmable gate array (FPGA) or an application-specific integrated circuit (ASIC). The apparatus can also include code that creates an execution environment for the computer program in question, for example, code that constitutes processor firmware, a protocol stack, a database management system, an operating system (for example an operating system or a combination of operating systems), a cross-platform runtime environment, a virtual machine, or a combination of one or more of them. The apparatus and execution environment can realize various different computing model infrastructures, such as web services, distributed computing and grid computing infrastructures.

A computer program (also known, for example, as a program, software, software application, software module, software unit, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A program can be stored in a portion of a file that holds other programs or data (for example, one or more scripts stored in a markup language document), in a single file dedicated to the program in question, or in multiple coordinated files (for example, files that store one or more modules, sub-programs, or portions of code). A computer program can be executed on one computer or on multiple computers that are located at one site or distributed across multiple sites and interconnected by a communication network.

Processors for execution of a computer program include, by way of example, both general- and special-purpose microprocessors, and any one or more processors of any kind of digital computer. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data. A computer can be embedded in another device, for example, a mobile device, a personal digital assistant (PDA), a game console, a Global Positioning System (GPS) receiver, or a portable storage device. Devices suitable for storing computer program instructions and data include non-volatile memory, media and memory devices, including, by way of example, semiconductor memory devices, magnetic disks, and magneto-optical disks. The processor and the memory can be supplemented by, or incorporated in, special-purpose logic circuitry.

Mobile devices can include handsets, user equipment (UE), mobile telephones (for example, smartphones), tablets, wearable devices (for example, smart watches and smart eyeglasses), implanted devices within the human body (for example, biosensors, cochlear implants), or other types of mobile devices. The mobile devices can communicate wirelessly (for example, using radio frequency (RF) signals) to various communication networks (described below). The mobile devices can include sensors for determining characteristics of the mobile device's current environment. The sensors can include cameras, microphones, proximity sensors, GPS sensors, motion sensors, accelerometers, ambient light sensors, moisture sensors, gyroscopes, compasses, barometers, fingerprint sensors, facial recognition systems, RF sensors (for example, Wi-Fi and cellular radios), thermal sensors, or other types of sensors. For example, the cameras can include a forward- or rear-facing camera with movable or fixed lenses, a flash, an image sensor, and an image processor. The camera can be a megapixel camera capable of capturing details for facial and/or iris recognition. The camera along with a data processor and authentication information stored in memory or accessed remotely can form a facial recognition system. The facial recognition system or one-or-more sensors, for example, microphones, motion sensors, accelerometers, GPS sensors, or RF sensors, can be used for user authentication.

To provide for interaction with a user, embodiments can be implemented on a computer having a display device and an input device, for example, a liquid crystal display (LCD) or organic light-emitting diode (OLED)/virtual-reality (VR)/augmented-reality (AR) display for displaying information to the user and a touchscreen, keyboard, and a pointing device by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments can be implemented using computing devices interconnected by any form or medium of wireline or wireless digital data communication (or combination thereof), for example, a communication network. Examples of interconnected devices are a client and a server generally remote from each other that typically interact through a communication network. A client, for example, a mobile device, can carry out transactions itself, with a server, or through a server, for example, performing buy, sell, pay, give, send, or loan transactions, or authorizing the same. Such transactions may be in real time such that an action and a response are temporally proximate; for example an individual perceives the action and the response occurring substantially simultaneously, the time difference for a response following the individual's action is less than 1 millisecond (ms) or less than 1 second (s), or the response is without intentional delay taking into account processing limitations of the system.

Examples of communication networks include a local area network (LAN), a radio access network (RAN), a metropolitan area network (MAN), and a wide area network (WAN). The communication network can include all or a portion of the Internet, another communication network, or a combination of communication networks. Information can be transmitted on the communication network according to various protocols and standards, including Long Term Evolution (LTE), 5G, IEEE 802, Internet Protocol (IP), or other protocols or combinations of protocols. The communication network can transmit voice, video, biometric, or authentication data, or other information between the connected computing devices.

Features described as separate implementations may be implemented, in combination, in a single implementation, while features described as a single implementation may be implemented in multiple implementations, separately, or in any suitable sub-combination. Operations described and claimed in a particular order should not be understood as requiring that the particular order, nor that all illustrated operations must be performed (some operations can be optional). As appropriate, multitasking or parallel-processing (or a combination of multitasking and parallel-processing) can be performed.

What is claimed is:

1. A computer-implemented method that identifies an insurance risk prediction model that generates a more accurate risk prediction result for a respective insurance service risk assessment and that requires personal attribute information, the computer-implemented method comprising:

receiving, at a prediction server, an insurance service scenario comprising variable data of personal attribute information associated with at least one insurance user;

generating, at the prediction server, at least two candidate insurance risk prediction models comprising a first model and a second model, wherein the first model comprises a neural network, and wherein the second model is constructed by modeling at least one modeling target value using a gradient boosting decision tree (GBDT), and wherein the at least one modeling target value includes at least one of a loss ratio, a claim frequency, and a claim amount of the at least one insurance user;

training, at the prediction server, the first model to include a learned continuous feature vector using a training objective function, wherein the training of the first model comprises:

randomly initializing, at the prediction server, parameters of the first model, generating, at the prediction server, N bins each comprising data of a different feature type included in the variable data of personal attribute information, generating, at the prediction server, a first discrete feature vector comprising at least N elements corresponding to the N bins, mapping, at the prediction server, the first discrete feature vector and at least a second discrete feature vector to generate a candidate continuous feature vector, inputting, at the prediction server and into the first model, the candidate continuous feature vector representing the variable data of personal attribute information, obtaining, at the prediction server, output of the first model indicating a risk score based on the candidate continuous feature vector, and optimizing, at the prediction server, the training objective function associated with the first model based on the risk score, the parameters of the first model, and the at least one modeling target value;

generating, at the prediction server, a first function output of a Tweedie regression objective function of the GBDT using the variable data of personal attribute information as an input to the second model;

generating, at the prediction server, a second function output of the first model using the variable data of personal attribute information that was used as an input to the first model;

generating, at the prediction server, a first statistical indicator based on the first function output and the input to the second model;

generating, at the prediction server, a second statistical indicator based on the second function output and the input to the first model;

selecting, at the prediction server and for the insurance service scenario, the insurance risk prediction model that is more statistically significant from the at least two candidate insurance risk prediction models based on a comparison of the first statistical indicator and the second statistical indicator; and generating, at the prediction server and for the insurance service scenario, an insurance risk prediction result of the at least one insurance user using the selected insurance risk prediction model.

2. The computer-implemented method of claim 1, further comprising preprocessing the variable data of personal attribute information, wherein the preprocessing, at the prediction server, comprises at least one of:

setting a weight for each personal attribute of the variable data;

supplementing an incomplete value with a default value in the variable data;

determining a selection of repeated variable data; processing interaction effects between the variable data; or generating new variable data based on the variable data.

3. The computer-implemented method of claim 1, wherein at least one of the at least two candidate insurance risk prediction models is a trained generalized linear model.

4. The computer-implemented method of claim 1, wherein the GBDT uses a gamma regression objective function as an objective function, and wherein the at least one modeling target value using the GBDT includes a difference between an actual modeling target value and a predicted modeling target value.

5. The computer-implemented method of claim 1, wherein the training objective function is optimized using a Stochastic Gradient Descent.

6. A non-transitory, computer-readable medium that identifies an insurance risk prediction model that generates a more accurate risk prediction result for a respective insurance service risk assessment and that requires personal attribute information, the non-transitory, computer-readable medium storing one or more instructions executable by a computer processor, included in a prediction server, to perform operations comprising:

receiving, at the prediction server, an insurance service scenario comprising variable data of personal attribute information associated with at least one insurance user;

generating, at the prediction server, at least two candidate insurance risk prediction models comprising a first model and a second model, wherein the first model comprises a neural network, and wherein the second model is constructed by modeling at least one modeling target value using a gradient boosting decision tree (GBDT), and wherein the at least one modeling target value includes at least one of a loss ratio, a claim frequency, and a claim amount of the at least one insurance user;

training, at the prediction server, the first model to include a learned continuous feature vector using a training objective function, wherein the training of the first model comprises:

randomly initializing, at the prediction server, parameters of the first model, generating, at the prediction server, N bins each comprising data of a different feature type included in the variable data of personal attribute information, generating, at the prediction server, a first discrete feature vector comprising at least N elements corresponding to the N bins, mapping, at the prediction server, the first discrete feature vector and at least a second discrete feature vector to generate a candidate continuous feature vector, inputting, at the prediction server and into the first model, the candidate continuous feature vector representing the variable data of personal attribute information, obtaining, at the prediction server, output of the first model indicating a risk score based on the candidate continuous feature, and optimizing, at the prediction server, the training objective function associated with the first model based on the risk score, the parameters of the first model, and the at least one modeling target value;

generating, at the prediction server, a first function output of a Tweedie regression objective function of the GBDT using the variable data of personal attribute information as an input to the second model;

generating, at the prediction server, a second function output of the first model using the variable data of personal attribute information that was used as an input to the first model;

generating, at the prediction server, a first statistical indicator based on the first function output and the input to the second model;

generating, at the prediction server, a second statistical indicator based on the second function output and the input to the first model;

selecting, at the prediction server and for the insurance service scenario, the insurance risk prediction model that is more statistically significant from the at least two candidate insurance risk prediction models based on a comparison of the first statistical indicator and the second statistical indicator; and generating, at the prediction server and for the insurance service scenario, an insurance risk prediction result of the at least one insurance user using the selected insurance risk prediction model.

7. The non-transitory, computer-readable medium of claim 6, further comprising one or more instructions to preprocess the variable data of personal attribute information, wherein the preprocessing, at the prediction server, comprises at least one of:

setting a weight for each personal attribute of the variable data;

supplementing an incomplete value with a default value in the variable data;

determining a selection of repeated variable data; processing interaction effects between the variable data; or generating new variable data based on the variable data.

8. The non-transitory, computer-readable medium of claim 6, wherein at least one of the at least two candidate insurance risk prediction models is a trained generalized linear model.

9. The non-transitory, computer-readable medium of claim 6, wherein the GBDT uses a gamma regression objective function as an objective function, and wherein the at least one modeling target value using the GBDT includes a difference between an actual modeling target value and a predicted modeling target value.

10. The non-transitory, computer-readable medium of claim 6, wherein the training objective function is optimized using a Stochastic Gradient Descent.

11. A computer-implemented system that identifies an insurance risk prediction model that generates a more accurate risk prediction result for a respective insurance service risk assessment and that requires personal attribute information, the computer-implemented system comprising:
   a prediction server including one or more computers; and
   one or more computer memory devices interoperably coupled with the one or more computers and having tangible, non-transitory, machine-readable media storing one or more instructions that, when executed by the one or more computers, perform operations comprising:
   receiving, at the prediction server, an insurance service scenario comprising variable data of personal attribute information associated with at least one insurance user;
   generating, at the prediction server, at least two candidate insurance risk prediction models comprising a first model and a second model, wherein the first model comprises a neural network, and wherein the second model is constructed by modeling at least one modeling target value using a gradient boosting decision tree (GBDT), and wherein the at least one modeling target value includes at least one of a loss ratio, a claim frequency, and a claim amount of the at least one insurance user;
   training, at the prediction server, the first model to include a learned continuous feature vector using a training objective function, wherein the training of the first model comprises:
   randomly initializing, at the prediction server, parameters of the first model,
   generating, at the prediction server, N bins each comprising data of a different feature type included in the variable data of personal attribute information,
   generating, at the prediction server, a first discrete feature vector comprising at least N elements corresponding to the N bins,
   mapping, at the prediction server, the first discrete feature vector and at least a second discrete feature vector to generate a candidate continuous feature vector,
   inputting, at the prediction server and into the first model, the candidate continuous feature vector representing the variable data of personal attribute information,
   obtaining, at the prediction server, output of the first model indicating a risk score based on the candidate continuous feature vector, and
   optimizing, at the prediction server, the training objective function associated with the first model based on the risk score, the parameters of the first model, and the at least one modeling target value;
   generating, at the prediction server, a first function output of a Tweedie regression objective function of the GBDT using the variable data of personal attribute information as an input to the second model;
   generating, at the prediction server, a second function output of the first model using the variable data of personal attribute information that was used as an input to the first model;
   generating, at the prediction server, a first statistical indicator based on the first function output and the input to the second model;
   generating, at the prediction server, a second statistical indicator based on the second function output and the input to the first model;
   selecting, at the prediction server and for the insurance service scenario, the insurance risk prediction model that is more statistically significant from the at least two candidate insurance risk prediction models based on a comparison of the first statistical indicator and the second statistical indicator; and
   generating, at the prediction server and for the insurance service scenario, an insurance risk prediction result of the at least one insurance user using the selected insurance risk prediction model.

12. The computer-implemented system of claim 11, wherein the operations further comprise preprocessing the variable data of personal attribute information, wherein the preprocessing, at the prediction server, comprises at least one of:
   setting a weight for each personal attribute of the variable data;
   supplementing an incomplete value with a default value in the variable data;
   determining a selection of repeated variable data; processing interaction effects between the variable data; or
   generating new variable data based on the variable data.

13. The computer-implemented system of claim 11, wherein at least one of the at least two candidate insurance risk prediction models is a trained generalized linear model.

14. The computer-implemented system of claim 11, wherein the GBDT uses a gamma regression objective function as an objective function, and wherein the at least one modeling target value using the GBDT includes a difference between an actual modeling target value and a predicted modeling target value.

15. The computer-implemented system of claim 11, wherein the training objective function is optimized using a Stochastic Gradient Descent.

* * * * *

UNITED STATES PATENT AND TRADEMARK OFFICE
CERTIFICATE OF CORRECTION

PATENT NO. : 11,244,402 B2
APPLICATION NO. : 16/022194
DATED : February 8, 2022
INVENTOR(S) : Yuxiang Lei et al.

Page 1 of 1

It is certified that error appears in the above-identified patent and that said Letters Patent is hereby corrected as shown below:

In the Specification

Column 1, Line 3, below "PROCESSING" insert -- CROSS-REFERENCE TO RELATED APPLICATIONS --.

In the Claims

Column 28, Line 21, in Claim 6, delete "feature," and insert -- feature vector, --.

Signed and Sealed this
Thirty-first Day of May, 2022

Katherine Kelly Vidal
*Director of the United States Patent and Trademark Office*